United States Patent
Miyata et al.

(10) Patent No.: US 11,749,996 B2
(45) Date of Patent: Sep. 5, 2023

(54) AGGREGATION CONTROL SYSTEM, AGGREGATION CONTROL METHOD, AND CONTROL APPARATUS

(71) Applicant: HITACHI, LTD., Tokyo (JP)

(72) Inventors: Makoto Miyata, Tokyo (JP); Takahiro Tsukishima, Tokyo (JP); Mitsumasa Takayama, Tokyo (JP); Kouichi Hiraoka, Tokyo (JP); Hideki Kobayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1042 days.

(21) Appl. No.: 16/489,804

(22) PCT Filed: Feb. 28, 2018

(86) PCT No.: PCT/JP2018/007644
§ 371 (c)(1),
(2) Date: Aug. 29, 2019

(87) PCT Pub. No.: WO2018/159720
PCT Pub. Date: Sep. 7, 2018

(65) Prior Publication Data
US 2020/0006954 A1 Jan. 2, 2020

(30) Foreign Application Priority Data
Mar. 3, 2017 (JP) .................. 2017-041117

(51) Int. Cl.
*H02J 3/32* (2006.01)
*H02J 7/00* (2006.01)
(Continued)

(52) U.S. Cl.
CPC .............. *H02J 3/322* (2020.01); *B60L 53/50* (2019.02); *B60L 53/62* (2019.02); *B60L 53/67* (2019.02);
(Continued)

(58) Field of Classification Search
CPC .......... B60L 53/50; B60L 53/62; B60L 53/67; H02J 3/144; H02J 13/00026;
(Continued)

(56) References Cited

U.S. PATENT DOCUMENTS

| 2009/0192655 A1* | 7/2009 | Ichikawa | ................. B60L 53/52 700/298 |
| 2013/0082640 A1* | 4/2013 | Nishibayashi | .......... B60L 53/68 320/106 |

(Continued)

FOREIGN PATENT DOCUMENTS

| EP | 2985172 A1 | 2/2016 |
| JP | 2012-50222 A | 3/2012 |

(Continued)

OTHER PUBLICATIONS

Extended European Search Report received in corresponding European Application No. 18760811.2 dated Nov. 20, 2020.
(Continued)

*Primary Examiner* — Santosh R Poudel
(74) *Attorney, Agent, or Firm* — MATTINGLY & MALUR, PC

(57) ABSTRACT

An aggregation control system for adjusting electric power between a plurality of facilities via a mobile storage battery apparatus, wherein each of the plurality of facilities includes a control apparatus that controls charging and discharging of the mobile storage battery apparatus, and the aggregation control system includes a server apparatus coupled to each control apparatus; and wherein the server apparatus: creates a charge-discharge condition for the mobile storage battery apparatus on the basis of management information for electric power demand and supply at a specified facility among the plurality of facilities; compares a charge-discharge request to a control apparatus of the specified facility with the charge-discharge conditions; and issues a command (Continued)

to the control apparatus to charge or discharge the mobile storage battery apparatus according to a result of the comparison.

3 Claims, 14 Drawing Sheets

(51) Int. Cl.
    *H02J 3/14*       (2006.01)
    *H02J 13/00*     (2006.01)
    *H02J 3/38*       (2006.01)
    *B60L 53/50*     (2019.01)
    *B60L 53/62*     (2019.01)
    *B60L 53/67*     (2019.01)

(52) U.S. Cl.
    CPC ............... *H02J 3/144* (2020.01); *H02J 3/32* (2013.01); *H02J 3/38* (2013.01); *H02J 7/0068* (2013.01); *H02J 13/00026* (2020.01); *Y04S 10/126* (2013.01)

(58) Field of Classification Search
    CPC . H02J 2300/00; H02J 2310/54; Y04S 10/126; Y04S 20/222; Y04S 40/126; Y04S 30/12; Y02B 70/3225; Y02E 60/00; Y02T 90/167; G06Q 50/06
    See application file for complete search history.

(56) References Cited

U.S. PATENT DOCUMENTS

| | | | |
|---|---|---|---|
| 2013/0300374 A1 | 11/2013 | Tomita et al. | |
| 2015/0006002 A1 | 1/2015 | Yamane | |
| 2016/0164313 A1 | 6/2016 | Ohta et al. | |
| 2017/0005515 A1 | 1/2017 | Sanders et al. | |
| 2017/0116686 A1* | 4/2017 | Fujita | H02J 3/322 |
| 2018/0186246 A1* | 7/2018 | Kudo | B60L 55/00 |
| 2018/0241229 A1* | 8/2018 | Kitaoka | B60L 53/65 |

FOREIGN PATENT DOCUMENTS

| | | |
|---|---|---|
| JP | 2013-106372 A | 5/2013 |
| JP | 2013-520942 A | 6/2013 |
| JP | 2014-023377 A | 2/2014 |
| JP | 2014-158404 A | 8/2014 |
| JP | 2015-011576 A | 1/2015 |
| JP | 2015-076977 A | 4/2015 |
| JP | 2016-92844 A | 5/2016 |
| WO | 2009/052446 A2 | 4/2009 |
| WO | 2011/102855 A1 | 8/2011 |
| WO | 2015/019184 A2 | 2/2015 |
| WO | 2017/009978 A1 | 1/2017 |
| WO | 2015/016192 A1 | 3/2017 |

OTHER PUBLICATIONS

Japanese Office Action received in corresponding Japanese Application No. 2017-041117 dated Mar. 9, 2021.
European Office Action received in corresponding European Application No. 18 760 811.2 dated Dec. 22, 2021.
International Search Report of PCT/JP2018/007644 dated Apr. 3, 2018.

* cited by examiner

FIG. 6

| | ITEM | UNIT | DETAILS | | | REMARKS |
|---|---|---|---|---|---|---|
| CUSTOMER | CUSTOMER CODE | | A001 | A002 | B001 | |
| | EV CODE | | A001V001 | A002V001 | B001V002 | |
| | NAME | | AA COMPANY | BB COMPANY | CC COMPANY | |
| CUSTOMER'S FACILITY | FACILITY CODE | | A001F001 | A002F001 | B001F001 | |
| | FACILITY NAME | | ○○ CITY MALL | ×× WARD BUSINESS OFFICE | △△ CITY PLANT | |
| | ADDRESS | | ○○ CITY··· | ×× WARD··· | △△ CITY··· | |
| | TELEPHONE NUMBER | | xx-xxxx-xxxxx | xx-xxxx-xxxxx | xx-xxxx-xxxxx | |
| | IP ADDRESS | | xxx.xxx.xxx.xxx | xxx.xxx.xxx.xxx | xxx.xxx.xxx.xxx | |
| SOLAR PHOTO-VOLTAIC GENERATION | MAXIMUM OUTPUT | kW | 10 | 5 | 20 | |
| | INSTALLATION DIRECTION | | SOUTH | SOUTH | SOUTH | |
| | INSTALLATION ANGLE | DEGREES | 60 | 30 | 45 | |
| | WEATHER FORECAST | | SUNNY | CLOUDY | RAINY | SUNNY, CLOUDY, OR RAINY |
| | POWER CONSUMPTION WHILE STAYING INSIDE | kWh/HOUR | 10 | 5 | 15 | |
| | POWER CONSUMPTION WHILE GOING OUT | kWh/HOUR | 5 | 3 | 10 | |
| GRID-CONNECTED POWER | GRID-CONNECTED POWER RECEIVING UNIT PRICE | YEN/kWh | 35 | 30 | 20 | |
| | POWER SELLING POSSIBILITY | | POSSIBLE | IMPOSSIBLE | POSSIBLE | POSSIBLE OR IMPOSSIBLE |
| | GRID-CONNECTED POWER SELLING UNIT PRICE | YEN/kWh | 35 | — | 25 | |
| DR REQUEST | DR REQUEST TYPE | | OUTPUT | INPUT | NONE | NONE, INPUT, OR OUTPUT |
| | DR REQUEST TARGET TIME SLOT | | 11:00-22:00 | 10:00-18:00 | — | |
| | DR REQUEST UNIT PRICE | YEN/kWh | 25 | 25 | — | |

FIG. 7

| | ITEM | UNIT | DETAILS | | | REMARKS |
|---|---|---|---|---|---|---|
| EV | EV CODE | | A001E001 | A002E001 | B001E002 | |
| | BUILT-IN STORAGE BATTERY CAPACITY | kWh | 30 | 25 | 10 | |
| | BUILT-IN STORAGE BATTERY CHARGING RATE LOWER LIMIT VALUE | % | 20 | 20 | 20 | |
| | BUILT-IN STORAGE BATTERY CHARGING RATE UPPER LIMIT VALUE | % | 90 | 90 | 90 | |
| | TRAVELING POWER CONSUMPTION | km/kWh | 10 | 15 | 5 | |
| | SCHEDULED USE DATE AND TIME | | Jan 30 | Jan 30 | Jan 30 | |
| | SCHEDULED USE DISTANCE | km | 50 | 75 | 25 | |
| CHARGE CONDITIONS | CHARGE POSSIBILITY | | IMPOSSIBLE | POSSIBLE | POSSIBLE | POSSIBLE OR IMPOSSIBLE |
| | CHARGING RATE UPPER LIMIT VALUE | % | — | 90 | 90 | |
| | CHARGE UNIT PRICE UPPER LIMIT VALUE | YEN/kWh | — | 30 | 30 | |
| DISCHARGE CONDITIONS | DISCHARGE POSSIBILITY | | IMPOSSIBLE | POSSIBLE | IMPOSSIBLE | POSSIBLE OR IMPOSSIBLE |
| | CHARGING RATE LOWER LIMIT VALUE | % | — | 40 | — | |
| | DISCHARGE UNIT PRICE LOWER LIMIT VALUE | YEN/kWh | — | 30 | — | |

FIG. 8

| ITEM | | UNIT | DETAILS | | | REMARKS |
|---|---|---|---|---|---|---|
| | FACILITY CODE | | A001F001 | A002F001 | B001F001 | |
| EV CONNEC-TION | APPARATUS CODE | | E001 | E001 | E001 | |
| | CONNECTION STATUS | | CONNECTED | CONNECTED | UNCONNECTED | CONNECTED OR UNCONNECTED |
| EV STATUS | EV CODE | | A001E001 | A002V001 | — | |
| | RESIDUAL CHARGE CAPACITY | kWh | 20 | 10 | — | |
| | CHARGING RATE | % | 66 | 66 | — | |
| | LATITUDE | | xx | xx | — | |
| | LONGITUDE | | xxx | xxx | — | |

| | ITEM | UNIT | DETAILS | | | REMARKS |
|---|---|---|---|---|---|---|
| CHARGE-DISCHARGE FACILITY | FACILITY CODE | | A001F001 | A002F001 | B001F001 | |
| | FACILITY NAME | | ○○ CITY MALL | ×× WARD BUSINESS OFFICE | △△ CITY PLANT | |
| | ADDRESS | | ○○ CITY··· | ×× WARD··· | △△ CITY··· | |
| | TELEPHONE NUMBER | | xx-xxxx-xxxxx | xx-xxxx-xxxxx | xx-xxxx-xxxxx | |
| | IP ADDRESS | | xxx.xxx.xxx.xxx | xxx.xxx.xxx.xxx | xxx.xxx.xxx.xxx | |
| CHARGE SOLICITATION | WHETHER CHARGING IS SOLICITED OR NOT | | NO | YES | YES | YES OR NO |
| | CHARGE UNIT PRICE | YEN/kWh | — | 30 | 30 | |
| | CHARGE AMOUNT PER UNIT TIME | kWh/HOUR | — | 5 | 5 | |
| DISCHARGE SOLICITATION | WHETHER DISCHARGING IS SOLICITED OR NOT | | YES | NO | YES | YES OR NO |
| | DISCHARGE UNIT PRICE | YEN/kWh | 25 | — | 25 | |
| | DISCHARGE AMOUNT PER UNIT TIME | kWh/HOUR | 5 | — | 5 | |

FIG. 10

WHEN CHARGING-DISCHARGING IS NOT PERFORMED OUTSIDE CUSTOMER'S FACILITY
(UNIT IS kWh FOR ITEMS OTHER THAN "CHARGING RATE")

| | ITEM | | 1ST DAY {80K} | | | | 2ND DAY {80L} | | | | 3RD DAY |
|---|---|---|---|---|---|---|---|---|---|---|---|
| | | | UPON DEPARTURE | WHILE GOING OUT | UPON ARRIVAL | WHILE STAYING INSIDE | UPON DEPARTURE | WHILE GOING OUT | UPON ARRIVAL | WHILE STAYING INSIDE | UPON DEPARTURE |
| LOAD | CONSUMPTION | | — | 1 | — | 10 | — | 1 | — | 10 | — |
| SOLAR PHOTOVOLTAIC GENERATING EQUIPMENT | POWER GENERATION | | — | 0 | — | 20 | — | 0 | — | 5 | — |
| | CURTAILMENT | | — | 0 | — | 5 | — | 0 | — | 0 | — |
| ELECTRIC VEHICLE | OUTSIDE CUSTOMER'S FACILITY | CONSUMPTION WHILE TRAVELING | — | 5 | — | 0 | — | 5 | — | 0 | — |
| | | CHARGE | — | 0 | — | 0 | — | 0 | — | 0 | — |
| | | DISCHARGE | — | 0 | — | 0 | — | 0 | — | 0 | — |
| | INSIDE CUSTOMER'S FACILITY | CHARGE | — | 0 | — | 5 | — | 0 | — | 5 | — |
| | | DISCHARGE | — | 0 | — | 0 | — | 0 | — | 0 | — |
| | | RESIDUAL CHARGE CAPACITY | 20 | — | 15 | — | 20 | — | 15 | — | 10 |
| | | CHARGING RATE | 80% | — | 60% | — | 80% | — | 60% | — | 40% |
| SYSTEM | INPUT (POWER RECEPTION) | | — | 1 | — | 0 | — | 1 | — | 0 | — |
| | OUTPUT (REVERSE POWER FLOW) | | — | 0 | — | 0 | — | 0 | — | 0 | — |
| 80A | 80B | | 80C | 80D | 80E | 80F | 80G | 80H | 80I | 80J | 80M |

WHEN CHARGING-DISCHARGING IS PERFORMED OUTSIDE CUSTOMER'S FACILITY
(UNIT IS kWh FOR ITEMS OTHER THAN "CHARGING RATE")

| ITEM | | | 1ST DAY | | | 2ND DAY | | | | 3RD DAY |
|---|---|---|---|---|---|---|---|---|---|---|
| | | | UPON DEPARTURE | WHILE GOING OUT | UPON ARRIVAL | WHILE STAYING INSIDE | UPON DEPARTURE | WHILE GOING OUT | UPON ARRIVAL | WHILE STAYING INSIDE | UPON DEPARTURE |
| LOAD | CONSUMPTION | | — | 1 | — | 10 | — | 1 | — | 10 | — |
| SOLAR PHOTOVOLTAIC GENERATING EQUIPMENT | POWER GENERATION | | — | 0 | — | 20 | — | 0 | — | 5 | — |
| | CURTAILMENT | | — | 0 | — | 0 | — | 0 | — | 0 | — |
| ELECTRIC VEHICLE | OUTSIDE CUSTOMER'S FACILITY | CONSUMPTION WHILE TRAVELING | — | 5 | — | 0 | — | 5 | — | 0 | — |
| | | CHARGE | — | 0 | — | 0 | — | 5 | — | 0 | — |
| | | DISCHARGE | — | 5 | — | 0 | — | 0 | — | 0 | — |
| | INSIDE CUSTOMER'S FACILITY | CHARGE | — | 0 | — | 10 | — | 0 | — | 0 | — |
| | | DISCHARGE | — | 0 | — | 0 | — | 0 | — | 0 | — |
| | RESIDUAL CHARGE CAPACITY | | 20 | — | 10 | — | 20 | — | 20 | — | 10 |
| | CHARGING RATE | | 80% | — | 40% | — | 80% | — | 80% | — | 40% |
| SYSTEM | INPUT (POWER RECEPTION) | | — | 1 | — | 0 | — | 1 | — | 0 | — |
| | OUTPUT (REVERSE POWER FLOW) | | — | 0 | — | 0 | — | 0 | — | 5 | — |

AGGREGATION CONTROL SYSTEM, AGGREGATION CONTROL METHOD, AND CONTROL APPARATUS

TECHNICAL FIELD

The present invention relates to an aggregation control system, an aggregation control method, and a control apparatus and is suited for use in, for example, an aggregation control system that performs charging and discharging of a built-in storage battery of an electric vehicle on behalf of a customer who possesses the electric vehicle.

BACKGROUND ART

In recent years, the generation of regenerative energy such as solar photovoltaic generation (hereinafter referred to as the renewable energy as necessary) has become popular because of heightening of environmental awareness and effects of subsidy systems such as FIG (Feed In Tariff) by the government, public institutions, and so on.

Since a power generation amount of such renewable energy is significantly affected by the weather and wind speeds, frequency fluctuations of the electric power system (hereinafter referred to as the system as necessary), overload on the system, voltage fluctuations, and so may be caused, which may sometimes become factors to make the system unstable.

In order to stabilize the system, for example, an ancillary service (a service, which is provided by a power generation company or the like in response to a request from an electric power supplier or the like, for adjusting the electric power when the demand-and-supply balance of the system has worsened due to, for example, fluctuations of the power generation amount of the renewable energy) is performed and the cost of this ancillary service is reflected in an electricity rate and may become a factor to raise the electricity rate. Also, as a result of the power generation by the renewable energy which can be significantly affected by the weather and the wind speeds, it becomes difficult to predict the demand-and-supply balance of the electric power; and the power generation by the renewable energy can become a factor to expand price fluctuations of the electric power exchange market.

Accordingly, stable supply of the electric power by the renewable energy is difficult, so that curtailment of the power generation amount of the renewable energy by the electric power supplier, cessation of grid connection for the renewable energy, cutbacks of the subsidy systems, and so on have progressed and advantages of customers and business companies who introduce the renewable energy have been reduced, which brings about the situation where the popularization of the renewable energy may possibly be hampered.

Because of the above-described background, a concept called a "Virtual Power Plant" (VPP) that effectively utilizes the electric power created on the side of customers of the electric power such as stand-alone houses, buildings, and commercial facilities has been becoming widespread. For example, with the VPP, non-utility generation facilities of companies and electric vehicles (hereinafter referred to as EVs [Electric Vehicles] as necessary) of households which are small-scale resources on the side of a plurality of customers are integrated and are controlled as if they were one power plant.

Furthermore, a VPP company/companies (hereinafter also referred to as an aggregator(s)) has also recently appeared who enters into demand response contracts with a plurality of customers and adjusts the power generation amount and the power consumption by controlling the resources possessed by each of the customers (for example, by charging or discharging a built-in storage battery of an EV) in response to an electric power adjustment request of, for example, the ancillary service from the electric power supplier or in order to earn profits from price fluctuations of the electric power exchange market. Generally, the aggregator pays some sort of remuneration to the customer(s) in compensation for the adjustment of the electric power.

Meanwhile, a concept of self-consumption which utilizes a storage battery installed within the premises of a customer and an EV without directly supplying the electricity generated by the renewable energy to the system has also been becoming widespread. Specifically speaking, this is the way of using any surplus electricity, which was generated by the renewable energy installed within the premises of the customer and remained without being used, by charging the storage battery installed within the same premises or the built-in storage battery of the EV with that surplus electricity once and then discharging and consuming the charged electricity during later peak demand hours. Since the electricity which may reversely flow into the system side can be curtailed by the self-consumption within the same premises, the aforementioned problems which may occur on the system side can be reduced and the curtailment of the power generation amount of the renewable energy can be sometimes avoided.

Accordingly, under the circumstances where the advantages of introducing the renewable energy are decreasing, the customers are trying to seek new means such as remunerations for participation in the demand response and money saving on electricity by means of the self-consumption of the electricity generated by the renewable energy.

Regarding this type of system, PTL 1 discloses a system for providing EV information to the aggregation system and delivering the electricity to the system side by controlling charging and/or discharging of the EV based on the information about each EV.

Furthermore, PTL 2 discloses an apparatus for efficient self-consumption of the electricity within the customer's facility by charging the storage battery or the EV with the electricity generated by the renewable energy in the form of a direct current without converting the direct current to an alternating current.

CITATION LIST

Patent Literature

PTL 1: Japanese Unexamined Patent Application Publication (Translation of PCT Application) No. 2013-520942
PTL 2: Japanese Patent Application Laid-Open (Kokai) Publication No. 2015-76977

SUMMARY OF THE INVENTION

Problems to be Solved by the Invention

According to the above-mentioned PTL's, the customer(s) can adjust the power consumption by controlling charging and/or discharging of the EV in response to the demand response request and efficiently perform the self-consumption of the electricity generated by the renewable energy within the customer's facility.

However, there is a problem with the electric energy which can be adjusted in response to the demand response or the electric energy which can be captively consumed within the customer's facility, that is, such electric energy is subject to restraints by the size of the power consumption of the load within the customer's facility or the size of the power consumption used when driving the EV.

For example, when the power consumption of the load within the customer's facility or the power consumption used when driving the EV is small, sufficient available capacity of the built-in storage battery of the EV may not be secured and the EV may not be able to be charged with the electricity generated at solar photovoltaic generating equipment within the customer's facility.

The present invention was devised in consideration of the above-described circumstances and aims at proposing an aggregation control system, an aggregation control method, and a control apparatus which are capable of expanding the electric energy that can be adjusted by the customer by means of charging and discharging of an EV, and which are capable of expanding the electric energy that can be captively consumed by the customer within the customer's facility.

Means to Solve the Problems

In order to solve the above-described problems, provided according to the present invention is an aggregation control system for adjusting electric power between a plurality of facilities via a mobile storage battery apparatus, wherein each of the plurality of facilities includes a control apparatus that controls charging and discharging of the mobile storage battery apparatus, and the aggregation control system includes a server apparatus coupled to each control apparatus; and wherein the server apparatus: creates a charge-discharge condition for the mobile storage battery apparatus on the basis of management information for electric power demand and supply at a specified facility among the plurality of facilities; compares a charge-discharge request to a control apparatus of the specified facility with the charge-discharge condition; and issues a command to the control apparatus to charge or discharge the mobile storage battery apparatus according to a result of the comparison.

Furthermore, provided according to the present invention is a control apparatus capable of controlling charging and discharging, at each of a plurality of facilities, of a mobile storage battery apparatus moving between the plurality of facilities, wherein the control apparatus is coupled to a server apparatus for aggregation control to adjust electric power between the plurality of facilities; and the server apparatus creates a charge-discharge condition for the mobile storage battery apparatus on the basis of management information for electric power demand and supply at a specified facility among the plurality of facilities, compares a charge-discharge request to a control apparatus of the specified facility with the charge-discharge conditions, and issues a command to charge or discharge the mobile storage battery apparatus according to a result of the comparison; and wherein the control apparatus receives the command from the server apparatus and performs charging and/or discharging of the mobile storage battery apparatus according to the command.

Furthermore, provided according to the present invention is an aggregation control method for adjusting electric power between a plurality of facilities via a mobile storage battery apparatus, wherein each of the plurality of facilities includes a control apparatus that controls charging and discharging of the mobile storage battery apparatus, and wherein a server apparatus coupled to each control apparatus: creates a charge-discharge condition for the mobile storage battery apparatus on the basis of management information for electric power demand and supply at a specified facility among the plurality of facilities; compares a charge-discharge request to a control apparatus of the specified facility with the charge-discharge condition; and issues a command to the control apparatus to charge or discharge the mobile storage battery apparatus according to a result of the comparison.

Advantageous Effects of the Invention

The present invention makes it possible to implement the aggregation control system, the aggregation control method, and the control apparatus which are capable of expanding the electric energy that can be captively consumed by the customer within the customer's facility by charging and discharging an EV at a plurality of places including those other than the customer's facility and which are capable of expanding the electric energy that can be provided by the customer by means of charging and discharging of the EV.

BRIEF DESCRIPTION OF DRAWINGS

FIG. 6 is a conceptual diagram illustrating the structure of a customer management table;

FIG. 7 is a conceptual diagram illustrating the structure of an EV management table;

FIG. 8 is a conceptual diagram illustrating the structure of an EV connection information table;

FIG. 9 is a conceptual diagram illustrating the structure of a charge-discharge facility management table;

FIG. 10 is a conceptual diagram for explaining a flow of the entire processing by the agent system according to this embodiment;

FIG. 11 is a conceptual diagram for explaining a flow of the entire processing by the agent system according to this embodiment;

DESCRIPTION OF EMBODIMENTS

Figure 1:
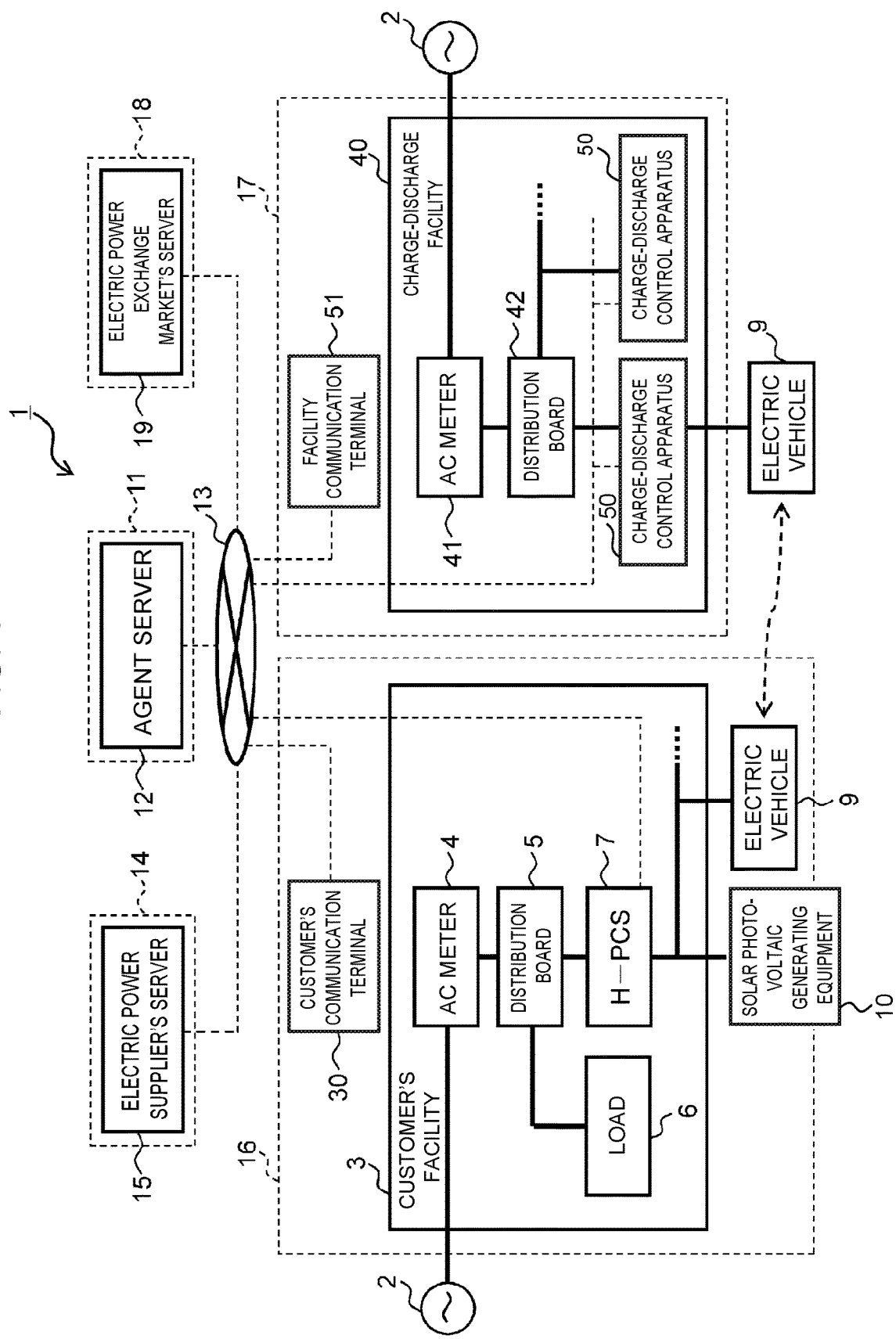
FIG. 1 is a block diagram illustrating an overall configuration of an agent system according to this embodiment.

An embodiment of the present invention will be described below in detail with reference to the drawings.

Incidentally, regarding embodiments below, parts which have the same structural elements and to which the same reference numeral is assigned perform the same operation as a general rule, so that any redundant explanations have been omitted.

(1) Configuration of Agent System

Referring to FIG. 1, the reference numeral 1 generally represents an agent system as an aggregation control system. This agent system 1 is configured by including an aggregator system 11, an electric power supplier's system 14, a customer's system 16, a charge-discharge facility administrator's system 17, and an electric power exchange market's system 18, which are connected to each other via a network 13 such as the Internet.

The electric power supplier's system 14 is a system which generates the electric power and sends the electric power via a system 2 to, for example, the customer's system 16 and the charge-discharge facility administrator's system 17 and in which an electric power supplier's server 15 is installed. Incidentally, the electric power supplier's system 14 receives the ancillary service from the aggregator system 11.

Furthermore, the electric power exchange market's system 18 is a system which transmits price information and buy-sell order information to the aggregator system 11 managed by an aggregator, who is qualified to participate in the electric power exchange market, and buys and sells the electric power from and to the aggregator system 11 and in which an electric power exchange market's server 19 is installed.

Figure 2:
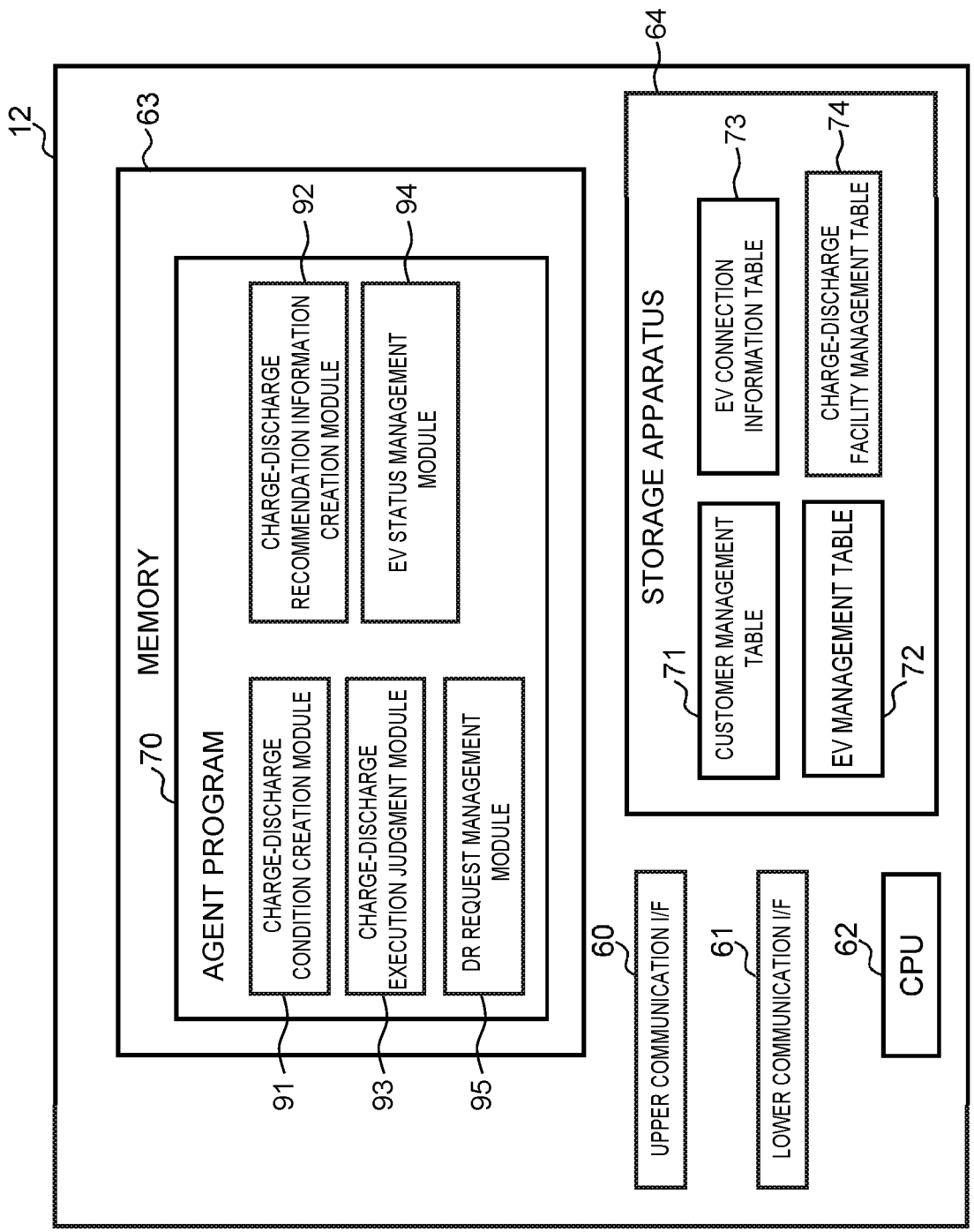
FIG. 2 is a block diagram illustrating the configuration of an agent server.

Referring to FIG. 2, the agent server 12 installed at the aggregator system 11 is a server apparatus and is configured by including an upper communication interface 60, a lower communication interface 61, a CPU 62, a memory 63, and a storage apparatus 64.

The upper communication interface 60 is an interface which performs protocol control when communicating with the electric power supplier's server 15 or when communicating with the electric power exchange market's server 19.

Furthermore, the lower communication interface 61 is an interface which performs protocol control when communicating with the customer's system 16 and the charge-discharge facility administrator's system 17 and is composed of, for example, an NIC (Network Interface Card).

The CPU 62 is a processor which controls the entire operation of the agent server 12. Furthermore, the memory 63 is composed of, for example, a semiconductor memory and is used to temporarily retain various programs and also is used as a work memory for the CPU 62. An agent program 70 described later is also stored and retained in this memory 63.

The storage apparatus 64 is composed of a large-capacity, nonvolatile storage apparatus such as hard disk drives and SSDs (Solid State Drives) and is used to retain various kinds of programs and data for a long period of time. Furthermore, the storage apparatus 64 stores a customer management table 71, an EV management table 72, an EV connection information table 73, and a charge-discharge facility management table 74 which will be described later.

Figure 3:
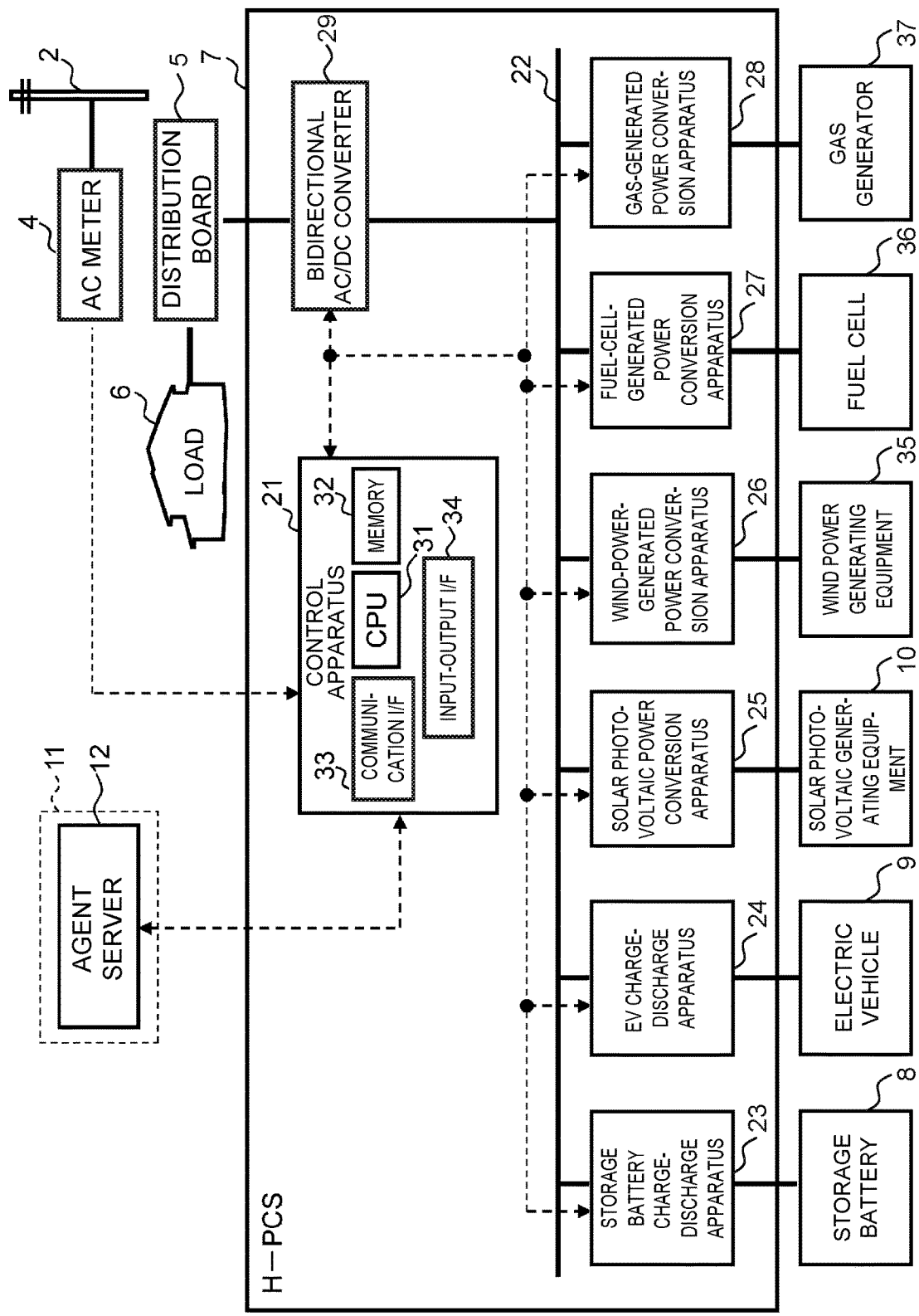
FIG. 3 is a block diagram illustrating the configuration of an H-PCS.

The customer's system 16 is a system managed by the customer and is configured by including a customer's facility 3, a customer's communication terminal 30, an electric vehicle (EV: Electric Vehicle) 9 as a mobile storage battery apparatus, and solar photovoltaic generating equipment 10. Incidentally, the customer's system 16 may further include a storage battery 8, wind power generating equipment 35, a fuel cell 36, and a gas generator 37 as illustrated in FIG. 3. The customer usually charges and discharges the electric vehicle 9 mainly at the customer's facility 3 and also charges and discharges the electric vehicle 9 at, for example, the charge-discharge facility administrator's system 17 as necessary.

The customer has entered into a demand response (hereinafter referred to as DR [Demand Response] as necessary) contract with the aggregator. A hybrid-power conditioning system 7 which is installed at the customer's facility 3 is connected, via the network 13, with the agent server 12 managed by the aggregator with whom the customer has entered into the DR contract; and they can send and receive information to and from each other. For example, when the electric vehicle 9 is connected and when the electric vehicle 9 is disconnected, the hybrid-power conditioning system 7 transmits EV connection information described later to the agent server 12.

The customer's facility 3 is equipment of the customer's own home or a business office or the like, where the customer belongs, and is configured by including an AC meter 4, a distribution board 5, a load 6, and the hybrid-power conditioning system 7 (H-PCS: Hybrid-Power Conditioning System). The electric power sent from the electric power supplier's system 14 to the customer's system 16 is supplied, via the AC meter 4 and the distribution board 5, to the load 6 such as electric appliances like lighting equipment and air conditioners of the customer's facility 3. Also, the hybrid-power conditioning system 7 is connected to the distribution board 5 and the customer can charge the electric vehicle 9.

The AC meter 4 is an electric energy meter such as a smart meter and an analogue-type electric energy meter and measures the electric energy used by the customer. Furthermore, the distribution board 5 is, for example, a distribution board supporting HEMS or a conventional analogue distribution board and blocks the electric current when a power supply cord is short-circuited.

The hybrid-power conditioning system 7 is an electric power conversion apparatus which has a function converting the electricity input from the system 2 from an alternating current to a direct current and charging the connected electric vehicle 9, and a function charging the electric vehicle 9 with the electricity generated from the solar photovoltaic generating equipment (PV: Photovoltaics) 10. Furthermore, the hybrid-power conditioning system 7 has a function converting the electricity discharged from the electric vehicle 9 and the electricity generated by the solar photovoltaic generating equipment 10 from the direct current to the alternating current and outputting it to the distribution board 5 side. Furthermore, the hybrid-power conditioning system 7 has a function controlling charging and/or discharging of the electric vehicle 9 in response to the DR request sent from the agent server 12 or in accordance with, for example, a surplus state of the electric power within the customer's facility 3.

Referring to FIG. 3, the hybrid-power conditioning system 7 is configured by including a control apparatus 21, and a plurality of charge-discharge apparatuses (a storage battery charge-discharge apparatus 23 and an EV charge-discharge apparatus 24), a plurality of electric power conversion apparatuses (a solar photovoltaic power conversion apparatus 25, a wind-power-generated power conversion apparatus 26, a fuel-cell-generated power conversion apparatus 27, and a gas-generated power conversion apparatus 28), and a bidirectional AC/DC (Alternating Current/Direct Current) converter 29 which are connected via a DC (Direct Current) bus 22.

With the hybrid-power conditioning system 7, the relevant electric power conversion apparatus generates the electric power from the sunlight, wind power, fuel chemical energy, gas, and so on by using the solar photovoltaic generating equipment 10, the wind power generating equipment 35, the fuel cell 36, the gas generator 37, etc. as power sources. Furthermore, the generated electric power is used by the storage battery 8 and the electric vehicle 9 by means of charging and discharging via the relevant charge-discharge apparatus.

The control apparatus 21 is a microcomputer apparatus for controlling the operation of the bidirectional AC/DC converter 29, the respective charge-discharge apparatuses, and the respective electric power conversion apparatuses and is configured by including a CPU (Central Processing Unit) 31, a memory 32, a communication interface 33, and an input-output interface 34.

The CPU 31 is a processor which controls the operation of the entire control apparatus 21. The memory 32 is composed of a volatile or nonvolatile semiconductor memory and used to store and retain various kinds of programs and information.

As the CPU 31 executes the programs stored in the memory 32, various kinds of processing as the entire control apparatus 21 is executed. Moreover, the communication interface 33 is an interface for performing protocol control when communicating with the agent server 12. Furthermore, the input-output interface 34 is an interface which performs protocol control and input-output control when communicating with, and performing input to and output from, the bidirectional AC/DC converter 29, the respective charge-discharge apparatuses, and the respective electric power conversion apparatuses.

Each charge-discharge apparatus is an apparatus which has a function controlling charging and/or discharging of electric power apparatuses (the storage battery 8 and the electric vehicle 9), which have a charging function, for example, within the range of 0% to 100% of their capacity in response to a command from the control apparatus 21.

Furthermore, each charge-discharge apparatus is equipped with a function measuring charge-discharge voltage values and charge-discharge electric current values of the target electric power apparatus and informing the control apparatus 21 of the measured values and a function informing the control apparatus 21 of information such as a charge amount and whether an error(s) exists or not regarding that electric power apparatus.

Similarly, each electric power conversion apparatus is an apparatus having a function discharging the electric power generated by the electric power apparatuses having a power generating function (the solar photovoltaic generating equipment 10, the wind power generating equipment 35, the fuel cell 36, and the gas generator 37) to the DC bus 22 within the range of 0% to 100% of such electric power in response to a command from the control apparatus 21. Furthermore, each electric power conversion apparatus is also equipped with a function measuring voltage values and current values of the electric power generated by the target electric power apparatus or the charged or discharged electric power and informing the control apparatus 21 of the measured values.

The bidirectional AC/DC converter 29 is a converter which has a function converting the electricity, which is supplied from the system 2, from the alternating current to the direct current and outputting the converted current to the DC bus 22, and converting the electricity, which is discharged from each charge-discharge apparatus and each electric power conversion apparatus to the DC bus 22, from the direct current to the alternating current and outputting the converted current to the system 2.

The bidirectional AC/DC converter 29 is also equipped with a function controlling the electric energy, which is output from the DC bus 22 to the system 2 or input from the system 2 to the DC bus 22, within the range of 0% to 100% of the electricity flowing through the DC bus 22 or the system 2 and a function measuring a DC voltage value, a DC current value, an AC voltage value, an AC current value, and an AC frequency of the electric power which is input to or output from the DC bus 22 and informing the control apparatus 21 of the measured values.

The customer's communication terminal 30 is a smartphone, a tablet, or the like used as a navigation system for the electric vehicle 9, is connected with the agent server 12 via the network 13, and can send EV use schedule information described later. Incidentally, a mobile communication network, an LPWA (Low Power Wide Area), and so on are used for the communication between the customer's communication terminal 30 and the agent server 12 so as to enable communication regardless of the location of the customer's communication terminal 30. However, when the customer is staying at the customer's facility 3 and sends/receives large-sized data such as map data, the customer's communication terminal 30 communicates with the agent server 12 via wires or Wi-Fi, etc. by way of the hybrid-power conditioning system 7.

The charge-discharge facility administrator's system 17 is a system managed by a charge-discharge facility administrator and is configured by including a charge-discharge facility 40, a charge-discharge control apparatus 50, and a facility communication terminal 51.

The charge-discharge facility 40: is a shop, a boost charge station, or the like where the customer stops by when they go out by using the electric vehicle 9; and is configured by including an AC meter 41, a distribution board 42, and a plurality of charge-discharge control apparatuses 50. Incidentally, the AC meter 41 and the distribution board 42 are similar to the AC meter 4 and the distribution board 5 which are explained earlier, so that their explanation has been omitted.

Furthermore, the charge-discharge control apparatus 50 is a control apparatus which has a function converting the electricity of the alternating current, which is input from the system 2, into the direct current and charging the electric vehicle 9 connected to that charge-discharge control apparatus 50 and a function converting the direct current, which is discharged from the electric vehicle 9, into the alternating current and outputting it to the distribution board 42.

At the charge-discharge facility 40, the electricity is supplied via the AC meter 41 and the distribution board 42 to the charge-discharge control apparatus 50; and when the customer stops by at the charge-discharge facility 40, they can charge and/or discharge the electric vehicle 9 by, for example, paying a fee as a compensation for charging to the charge-discharge facility administrator.

The charge-discharge facility administrator has entered into an EV charge-discharge contract with the aggregator. The charge-discharge control apparatus 50 is connected with the charge-discharge facility administrator's system 17 via the agent server 12 and the network 13, so that they can send and receive information to and from each other.

For example, when the electric vehicle 9 is connected to the charge-discharge control apparatus 50 and when the electric vehicle 9 is disconnected from the charge-discharge control apparatus 50, the charge-discharge control apparatus 50 sends EV connection information described later to the agent server 12. Furthermore, the charge-discharge control apparatus 50 can receive a charge-discharge command sent from the agent server 12. The charge-discharge control apparatus 50 which has received the charge-discharge command executes charging and/or discharging of the electric vehicle 9 pursuant to the contract between the charge-discharge facility administrator and the aggregator.

The facility communication terminal 51 is a smartphone, a tablet, a personal computer, or the like possessed by the charge-discharge facility administrator, is connected with the agent server 12 via the network 13, and can send charge-discharge solicitation information described later and so on.

(2) Charge-Discharge Adjustment Support Function According to This Embodiment

Next, a charge-discharge adjustment support function mounted in the agent server 12 according to this embodiment will be explained. This agent server 12 is equipped with a charge-discharge support function presenting a detection result of a place where the electric vehicle 9 which meets specified conditions can be charged or discharged, to the customer. This agent server 12 is also equipped with a charge-discharge support function presenting the position of the electric vehicle 9 which meets specified conditions to the charge-discharge facility administrator.

Practically, in a case of this embodiment, when the customer goes out by the electric vehicle 9, the agent server 12 displays charge-discharge facilities 40 capable of charging and discharging the electric vehicle 9 near the point where the customer is currently located, on a screen of the customer's communication terminal 30.

Figure 4:
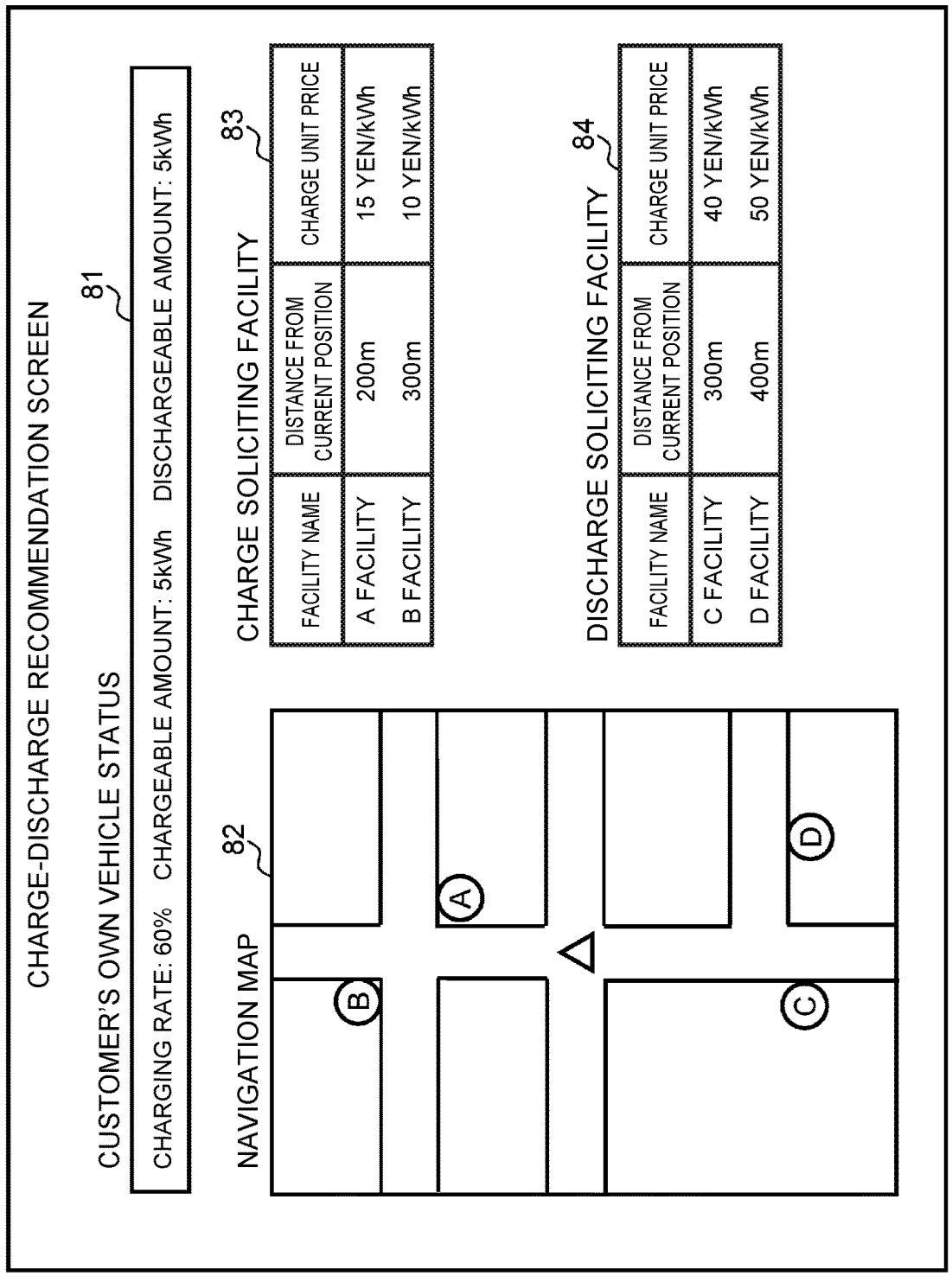
FIG. 4 is a schematic diagram which schematically illustrates an EV charge-discharge recommendation screen.

FIG. 4 illustrates a charge-discharge recommendation screen displayed on the customer's communication terminal 30. The customer's own vehicle status display part 81 on the screen is an area displaying the status of the electric vehicle 9 and displays a charging rate, a chargeable amount (the electric energy that can be charged until the charging rate reaches a charging rate upper limit value), and a dischargeable amount (the electric energy that can be discharged until the charging rate reaches a charging rate lower limit value).

A navigation map display part 82 on the left side of the screen, a charge soliciting facility display part 83 on the upper right side of the screen, and a discharge soliciting facility display part 84 on the lower right side of the screen display information of the charge-discharge control apparatus 50 based on the charge-discharge recommendation information sent from the agent server 12. The navigation map display part 82 graphically displays the positions of charge-discharge facilities 40 around the electric vehicle 9. The charge soliciting facility display part 83 displays a list of facilities which provide charge solicitations; and the discharge soliciting facility display part 84 displays a list of facilities which provides discharge solicitations, together with the distance from the current position and charge-discharge unit prices.

By displaying the screen illustrated in FIG. 4 to the customer, the customer can become aware of a facility or facilities where they can perform charging and discharging under advantageous conditions for themselves at the location(s) other than the customer's facility 3.

Furthermore, when providing a charge-discharge solicitation, the agent server 12 displays an electric vehicle(s) 9 near the charge-discharge facility 40 on the screen of the facility communication terminal 51. The charge-discharge facility administrator refers to this screen to determine a charge unit price and a discharge unit price at the charge-discharge facility 40.

Figure 5:
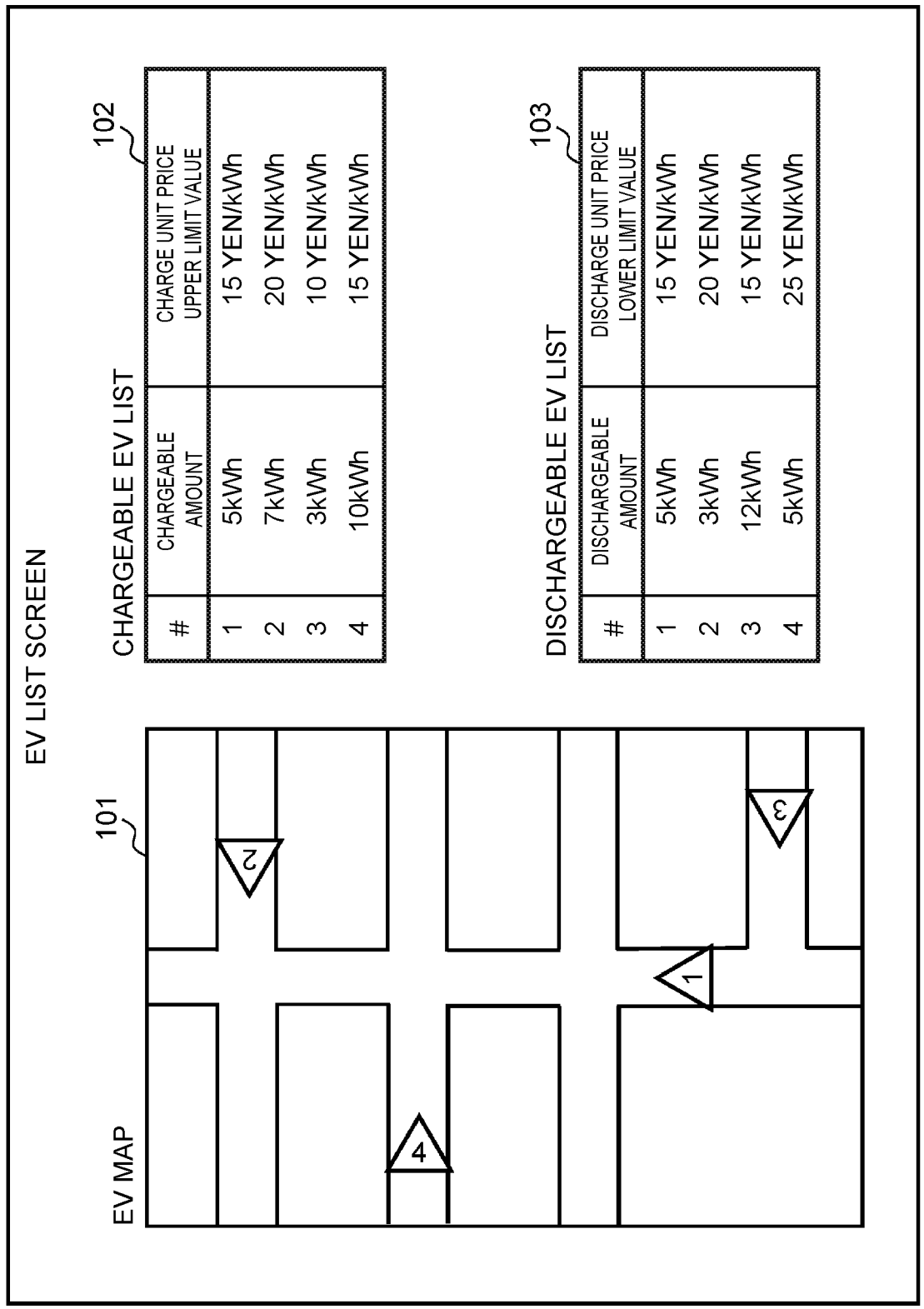
FIG. 5 is a schematic diagram which schematically illustrates an EV list display screen.

FIG. 5 illustrates an EV list screen displayed on the facility communication terminal 51. An EV map display part 101 on the left side of the screen graphically displays the positions of electric vehicles 9. A chargeable EV list display part 102 on the upper right side of the screen displays information about the electric vehicles 9 regarding charging (a chargeable amount and a charge unit price upper limit value); and a dischargeable EV list display part 103 on the lower right side of the screen displays information about the electric vehicle 9 regarding discharging (a dischargeable amount and a discharge unit price lower limit value).

By displaying the screen illustrated in FIG. 5 on the charge-discharge facility administrator, the charge-discharge facility administrator can check whether any customer is located in their vicinity or not, pull in the customers to their shop or the like at appropriate timing, and share information of emergency electric power supply in times of disasters.

In order to implement the above-described charge-discharge adjustment support function, the agent program 70 includes a charge-discharge condition creation module 91, a charge-discharge recommendation information creation module 92, a charge-discharge execution judgment module 93, an EV status management module 94, and a DR request management module 95.

The charge-discharge condition creation module 91 is a program which has a function creating preconditions for performing charging or discharging of the electric vehicle 9 at a place other than the customer's facility 3.

The charge-discharge recommendation information creation module 92 is a program which has a function creating information about a facility or facilities other than the customer's facility 3 where it is recommended to perform charging or discharging of the electric vehicle 9.

The charge-discharge execution judgment module 93 is a program which has a function judging whether charging should be executed, discharging should be executed, or charging or discharging should not be executed at the charge-discharge facility 40 connected with the electric vehicle 9.

The EV status management module 94 is a program which has a function receiving the EV use schedule information and saving it in the EV management table 72, receiving the EV connection information and saving it in the EV connection information table 73, and sending the EV status such as the execution of charging and discharging to the customer's communication terminal 30.

The DR request management module 95 is a program which has a function receiving an advance notice of an ancillary service request from the electric power supplier's server 15 and saving it in the customer management table 71, receiving an official request for the ancillary service from the electric power supplier's server 15, creating DR request information to the customer's system 16, and sending the DR request information to the hybrid-power conditioning system 7.

The customer management table 71 stores information about the customer's system 16 as illustrated in FIG. 6 and is composed of customer information (a customer code, an EV code, and a name), a customer's facility information (a facility code, a facility name, an IP address, a name, an address, and a telephone number), solar photovoltaic generation information (a maximum output, an installation direction, an installation angle, and weather forecast), grid-connected power information (power consumption while staying inside, power consumption while going out, a grid-connected power receiving unit price, power selling possibility, and a grid-connected power selling unit price), and DR request information (a DR request type, a DR request target time slot, and a DR request unit price).

Of these pieces of information, the customer information, the customer's facility information, the solar photovoltaic generation information, and the grid-connected power information are information which the aggregator system 11 acquires from the customer's system 16 when the customer and the aggregator enter into the demand response contract.

However, the weather forecast which is one of the solar photovoltaic generation information is acquired in a cycle of, for example, once every day from a weather information site or the like. The weather forecast column stores information such as "SUNNY," "CLOUDY," or "RAINY."

The power selling possibility column stores information such as "POSSIBLE" or "IMPOSSIBLE"; and when "IMPOSSIBLE" is stored in the power selling possibility column, the grid-connected power selling unit price column stores "-".

Furthermore, the DR request information is information which the agent server 12 acquires through the advance notice of the ancillary service request from the electric power supplier's server 15. The DR request type which is one of the DR request information is: "INPUT" in a case of a direction to increase a flow of the electric power to be input from the system 2 to the hybrid-power conditioning system 7; "OUTPUT" in a case of a direction to increase a flow of the electric power to be output from the hybrid-power conditioning system 7 to the system 2; and "NONE" when there is no DR request.

The DR request target time slot is a target time slot of the DR request to the customer. The DR request unit price is a unit price of an electricity rate for the customer according to the DR request.

The EV management table 72 stores information about EVs as illustrated in FIG. 7 and is composed of EV information (an EV code, a built-in storage battery capacity, a built-in storage battery charging rate lower limit value, a built-in storage battery charging rate upper limit value, traveling power consumption, scheduled use date and time, and scheduled use distance), charge conditions (charge possibility, a charging rate upper limit value, and a charge unit price upper limit value), and discharge conditions (discharge possibility, a charging rate lower limit value, and a discharge unit price lower limit value).

Of these pieces of information, the EV information is information which the aggregator system 11 acquires from the customer's system 16 when the customer and the aggregator enter into the demand response contract. However, the scheduled use date and time and the scheduled use distance are information acquired by the agent server 12 through transmission from the customer's communication terminal 30.

The charge conditions and the discharge conditions are information created during charge-discharge condition creation processing. The built-in storage battery charging rate lower limit value and the built-in storage battery charging rate upper limit value which are included in the EV information are an upper limit value and a lower limit value of a charging rate which is set in consideration of, for example, the life of the battery; and the charging rate upper limit value, which is one of the charge conditions, and the charging rate lower limit value, which is one of the discharge conditions, are an upper limit value and a lower limit value which are set by, for example, considering necessary electric energy to use the electric vehicle 9.

For example, regarding the charging rate upper limit value, the same value as the built-in storage battery charging rate upper limit value is used. Moreover, the charging rate lower limit value is calculated from the built-in storage battery charging rate lower limit value, the scheduled use distance, and the traveling power consumption.

Specifically speaking, assuming that the built-in storage battery charging rate lower limit value is 20%, the scheduled use distance is 75 km, the traveling power consumption is 15 km/kWh, and the built-in storage battery capacity is 25 kWh, the built-in storage battery lower limit capacity can be calculated as 5 kWh in this case by multiplying the built-in storage battery charging rate lower limit value by the battery capacity. On the other hand, the power consumption while traveling is calculated as 5 kWh by dividing the scheduled use distance by the traveling power consumption. The charge lower limit capacity is calculated as 10 kWh by adding the built-in storage battery lower limit capacity and the power consumption while traveling. The charging rate lower limit value is calculated as 40% by dividing this the charge lower limit capacity by the built-in storage battery capacity. Incidentally, the charge possibility, the charge unit price upper limit value, the discharge possibility, and the discharge unit price lower limit value are determined by EV charge-discharge condition creation processing described later.

Incidentally, the charge possibility column of the charge conditions stores "POSSIBLE" or "IMPOSSIBLE"; and when the charge possibility column stores "IMPOSSIBLE," the relevant charging rate upper limit value column and the relevant charge unit price upper limit value column store "-". Similarly, the discharge possibility column of the discharge conditions stores "POSSIBLE" or "IMPOSSIBLE"; and when the discharge possibility column stores "IMPOSSIBLE," the relevant charging rate lower limit value column and the relevant discharge unit price lower limit value column store "-".

The EV connection information table 73 stores information about connections to electric vehicles 9 at the charge-discharge facility 40 as illustrated in FIG. 8 and is composed of EV connection information (a facility code, an apparatus code, and a connection status) and EV status information (an EV code, a residual charge capacity, a charging rate, latitude, and longitude).

These pieces of information are information to be transmitted when an electric vehicle 9 is connected to the hybrid-power conditioning system 7 of the customer's facility 3 or the charge-discharge control apparatus 50 of the charge-discharge facility 40 or when the electric vehicle 9 is disconnected from the hybrid-power conditioning system 7 or the charge-discharge control apparatus 50.

Incidentally, the connection status column stores "CONNECTED" or "UNCONNECTED"; and when the connection status column stores "UNCONNECTED," the relevant EV code column, the relevant residual charge capacity column, the relevant charging rate column, the relevant latitude column, and the relevant longitude column store "-".

Incidentally, the above-described EV status information (the EV code, the residual charge capacity, and the charging rate) may be transmitted from the customer's communication terminal 30, which is mounted in the electric vehicle 9, to the agent server 12 via a mobile phone network, LPWA, or the like instead of being transmitted from the hybrid-power conditioning system 7 or the charge-discharge control apparatus 50 to the agent server 12. As a result of direct communication between the customer's communication terminal 30 and the agent server 12, the agent server 12 can collect the EV status information even when the electric vehicle 9 is traveling (in the state of not being connected to the hybrid-power conditioning system 7 or the charge-discharge control apparatus 50). Under this circumstance, the customer's communication terminal 30 may transmit its own positional information (such as the latitude and the longitude) to the agent server 12.

The charge-discharge facility management table 74 stores information about charge-discharge facilities 40 as illustrated in FIG. 9 and is composed of charge-discharge facility information (a facility code, a facility name, an address, a telephone number, and an IP address), charge solicitation information (whether charging is solicited or not, a charge unit price, and a charge amount per unit time), and discharge solicitation information (whether discharging is solicited or not, a discharge unit price, and a discharge amount per unit time).

Incidentally, the whether-charging-is-solicitated-or-not column stores "YES" or "NO"; and when the whether-charging-is-solicitated-or-not column stores "NO," the relevant charge unit price column and the relevant charge amount per-unit-time column store "-". Moreover, the whether-discharging-is-solicitated-or-not column stores "YES" or "NO"; and when the whether-discharging-is-solicitated-or-not column stores "NO," the relevant discharge unit price column and the relevant discharge amount per-unit-time column store "-".

The charge-discharge facility information is information which the aggregator system 11 acquires from the charge-discharge facility administrator's system 17 when the aggregator and the charge-discharge facility administrator enter into a contract. The charge solicitation information and the discharge solicitation information are information transmitted from the facility communication terminal 51.

(3) Flows of Processing by Agent System

Processing by the agent system 1 will be explained by using transition tables 80, 90 illustrated in FIG. 10 and FIG. 11. The transition tables 80, 90 show changes in the charging rate of the built-in storage battery of the electric vehicle 9 and changes in the charge-discharge amount of the electric vehicle 9 at the customer's facility 3 and the charge-discharge facility 40. FIG. 10 illustrates a case where the electric vehicle 9 is charged and discharged only at the customer's facility 3; and FIG. 11 illustrates a case where the electric vehicle 9 is charged and discharged at both the customer's facility 3 and the charge-discharge facility 40.

Items in item columns (80A, 80B) of FIG. 10 and item columns (90A, 90B) of FIG. 11 respectively show, from the top of the relevant table, power consumption of the load 6 of the customer's facility 3, a (possible) power generation amount of the solar photovoltaic generating equipment 10, a curtailed power generation amount of the solar photovoltaic generating equipment 10, power consumption of the electric vehicle 9 while traveling, a charge amount of the electric vehicle 9 at the charge-discharge facility 40, a discharge amount of the electric vehicle 9 at the charge-discharge facility 40, a charge amount of the electric vehicle 9 at the customer's facility 3, a discharge amount of the electric vehicle 9 at the customer's facility 3, a residual charge capacity of the electric vehicle 9, a charging rate of the electric vehicle 9, the electric energy which is input from the system 2 to the customer's facility 3, and a discharge amount which is output from the customer's facility 3 to the system 2.

Numerical values stored in the respective columns 80C to 80M are numerical values of the electric energy (unit: kWh) and the charging rate (unit: %) and respectively form column groups of a first day (column 80K and column 90K), a second day (column 80L and column 90L), and a third day (column 80M and column 90M).

Each first day column group is composed of columns regarding the customer (and the electric vehicle 9) upon departure (column 80C, column 90C), while going out (column 80D, column 90D), upon arrival (column 80E, column 90E), and while staying inside (column 80F, column 90F). Incidentally, the departure means to depart from the customer's facility 3; going out means to go out of the customer's facility 3; the arrival means to arrive at the customer's facility 3; and when staying inside means to stay at the customer's facility 3.

Similarly, each second day column group is composed of columns regarding the customer (and the electric vehicle 9) upon departure (column 80G, column 90G), while going out (column 80H, column 90H), upon arrival (column 80I, column 90I), and while staying inside (column 80J, column 90J).

On the first day in FIG. 10 and FIG. 11, 1 kWh is consumed while going out and 10 kWh is consumed while staying inside, so that a total of 11 kWh is consumed; and, on the other hand, 20 kWh is generated while staying inside. Therefore, the power generation amount of the solar photovoltaic generating equipment 10 is larger than the power consumption of the load 6, thereby generating surplus electric power.

On the second day in FIG. 10 and FIG. 11, 1 kWh is consumed while going out and 10 kWh is consumed while staying inside, so that a total of 11 kWh is consumed; and, on the other hand, 5 kWh is generated while staying inside. Therefore, the power generation amount of the solar photovoltaic generating equipment 10 is smaller than the power consumption of the load 6, thereby causing a shortage of the electric power.

Under this circumstance, it is assumed that: on the first day, no output (reverse power flow) of the electric power from the customer's facility 3 is recognized; and on the second day, the aggregator system 11 issues a demand response request to the customer's system 16 and the curtailment of the input (power reception) from the system 2 (or the output [reverse power flow]) is requested. It is also assumed that an upper limit value of the charging rate of the built-in storage battery for the electric vehicle 9 is 80% and a lower limit value of the charging rate is 40%.

Firstly, the details of FIG. 10 will be explained. The residual charge capacity of the electric vehicle 9 upon departure (column 80C) on the first day is 20 kWh (the charging rate is 80%). The power consumption is 5 kWh while going out (column 80D) and the residual charge capacity upon arrival (column 80E) is 15 kWh (the charging rate is 60%).

The power consumption of the load 6 while going out (80D) is 1 kWh and the customer's system 16 receives the power of 1 kWh from the system 2. The power consumption of the load 6 while staying inside (column 80F) is 10 kWh and the (possible) power generation amount of the solar photovoltaic generating equipment 10 is 20 kWh. As a result of the deduction, 10 kWh is a surplus amount.

Of the surplus amount, 5 kWh is used to charge the electric vehicle 9. Since the upper limit of the charging rate of the built-in storage battery for the electric vehicle 9 is 80%, 5 kWh is the limit of the charge amount. Regarding the remaining 5 kWh of the surplus amount, the power generation amount of the solar photovoltaic generating equipment 10 is curtailed to change from 20 kWh to 15 kWh in order to make the supply of the electric power meet the demand.

The residual charge capacity of the electric vehicle 9 upon departure (column 80G) on the second day is 20 kWh (the charging rate is 80%). The power consumption is 5 kWh while going out (column 80H) and the residual charge capacity upon arrival (column 80I) is 15 kWh (the charging rate is 60%). The power consumption of the load 6 while going out (80H) is 1 kWh and the power of 1 kWh is received from the system 2.

The power consumption of the load 6 while staying inside (column 80J) is 10 kWh and the (possible) power generation amount of the solar photovoltaic generating equipment 10 is 5 kWh, so that as a result of the deduction, there is a shortage of 5 kWh. While staying inside (column 80J), there is a demand response request from the aggregator system 11 to the customer's system 16 and it is requested to curtail the input (power reception) from the system 2. Since the lower limit of the charging rate of the built-in storage battery for the electric vehicle 9 is 40%, 5 kWh is discharged and the input (power reception) from the system 2 is set to 0 kWh.

Next, the details of FIG. 11 will be explained. The residual charge capacity of the electric vehicle 9 upon departure (column 90C) on the first day is 20 kWh (the charging rate is 80%). The power consumption while going out (column 90D) is 5 kWh, and 5 kWh is further discharged at the charge-discharge facility 40, and the residual charge capacity upon arrival (column 90E) is 10 kWh (the charging rate is 40%).

The power consumption of the load 6 while staying inside (column 90F) is 10 kWh and the (possible) power generation amount of the solar photovoltaic generating equipment 10 is 20 kWh. As a result of the deduction, 10 kWh is a surplus amount. Of the surplus amount, 10 kWh is used to charge the electric vehicle 9. Since the entire surplus amount is used to charge the electric vehicle 9, it is unnecessary to curtail the power generation amount of the solar photovoltaic generating equipment 10. The residual charge capacity of the electric vehicle 9 upon departure (column 90G) on the second day is 20 kWh (the charging rate is 80%).

The power consumption while going out (column 90H) is 5 kWh, but 5 kWh is charged at the charge-discharge facility 40 and the residual charge capacity upon arrival (column 90I) becomes 20 kWh (the charging rate is 80%). The power consumption of the load 6 while staying inside (column 90J) is 10 kWh and the (possible) power generation amount of the solar photovoltaic generating equipment 10 is 5 kWh, so that as a result of the deduction, there is a shortage of 5 kWh.

There is a demand response request from the aggregator while staying inside (column 90J) and it is requested to curtail the input (power reception) from the system 2. So, 10 kWh is discharged from the electric vehicle 9 and 5 kWh is output (reverse power flow) to the system 2.

While going out on the first day, neither charging nor discharging is performed at the charge-discharge facility 40 in FIG. 10, but 5 kWh is discharged at the charge-discharge facility 40 in FIG. 11. Accordingly, while staying inside on the first day, FIG. 10 shows that the electric vehicle 9 can be charged with only 5 kWh and the power generation amount of the solar photovoltaic generating equipment 10 is curtailed to change from 10 kWh to 5 kWh; and FIG. 11 shows that the electric vehicle 9 is charged with 10 kWh, so that it is unnecessary to curtail the power generation amount of the solar photovoltaic generating equipment 10.

Furthermore, while going out on the second day, neither charging nor discharging is performed at the charge-discharge facility 40 in FIG. 10, but 5 kWh is charged at the charge-discharge facility 40 in FIG. 11. Accordingly, while staying inside on the second day, FIG. 10 shows that 5 kWh is discharged from the electric vehicle 9 in response to the demand response request, while FIG. 11 shows that 10 kWh is discharged from the electric vehicle 9 in response to the demand response request.

By performing charging and discharging at a place other than the customer's facility 3 (the charge-discharge facility 40 in the above-described example) as described above while going out, the electric energy which can be captively consumed at the customer's facility 3 located within the facility of the customer expands and the electric energy which can be adjusted by charging and discharging of the electric vehicle 9 in response to the demand response request expands.

Figure 12:
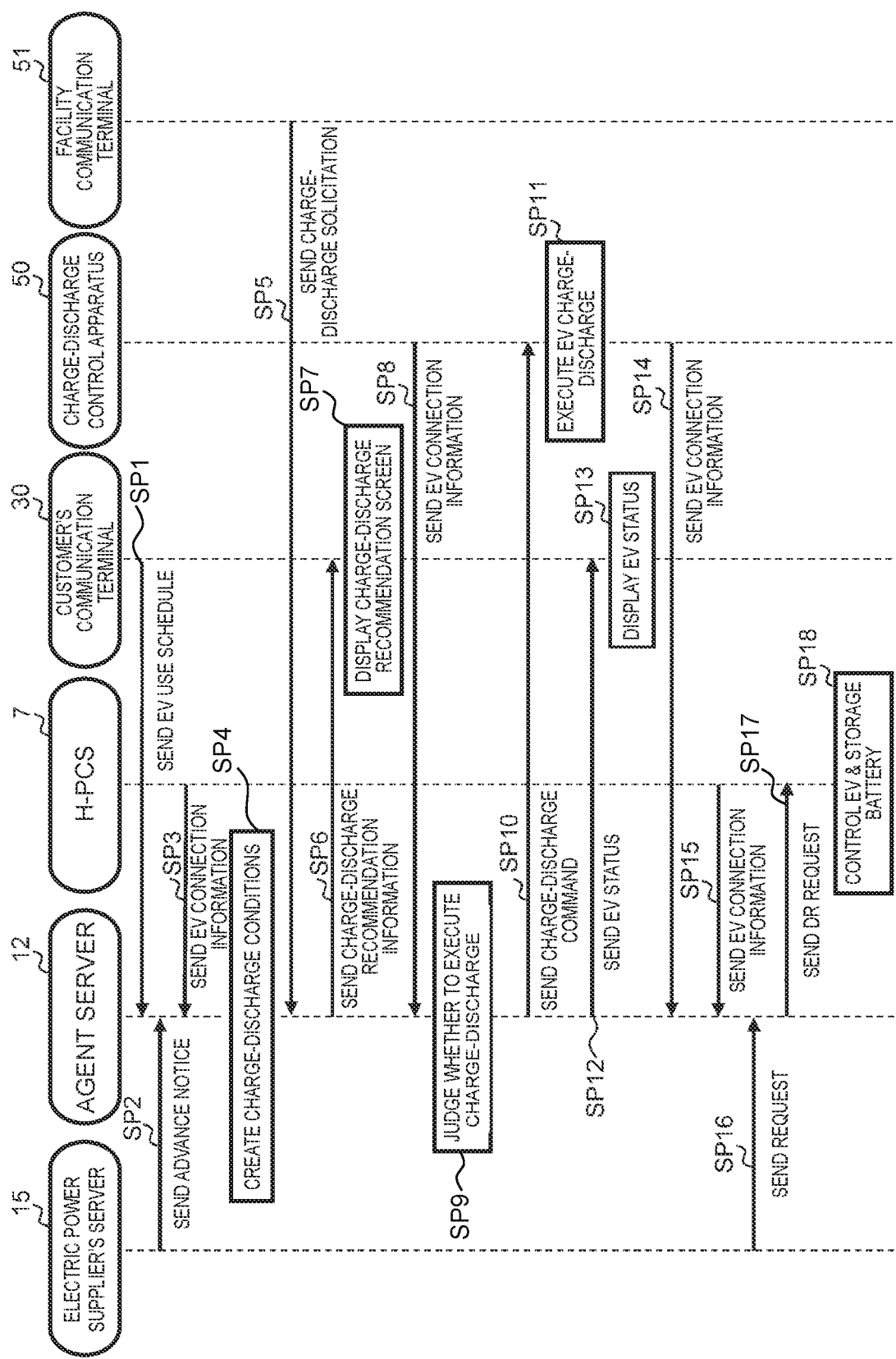
FIG. 12 is a sequence diagram illustrating a flow of the entire processing by the agent system according to this embodiment.

FIG. 12 illustrates a flow of processing between the electric power supplier's server 15, the agent server 12, the hybrid-power conditioning system 7, the customer's communication terminal 30, the charge-discharge control apparatus 50, and the facility communication terminal 51.

The customer's communication terminal 30 transmits the EV use schedule information (the customer code, the EV code, the scheduled use date and time, and the scheduled use distance) about an electric vehicle 9, which is registered by the customer, to the EV status management module 94 of the agent server 12 (SP1).

The EV status management module 94 of the agent server 12 saves the received EV use schedule information in the EV management table 72. Incidentally, regarding the above-mentioned EV use schedule information, the information registered by the customer may be used, but the information may be generated by the EV status management module 94 of the agent server 12 by executing prediction processing.

Regarding the prediction processing, possible means are, for example, a means of extracting use dates and times and use distances which match the relevant month and the relevant day(s) of the week from the past EV connection information of the electric vehicle 9 and calculating an average use date and time and an average use distance, and a means of adopting a high-frequency-use date and time and a high-frequency-use distance.

The electric power supplier's server 15 managed by the electric power supplier transmits an advance notice of an ancillary service request to the DR request management module 95 of the agent server 12 according to, for example, a prediction of a future power generation amount and demand amount of the system 2 (SP2).

The DR request management module 95 of the agent server 12 creates the DR request information (the DR request type, the DR request target time slot, and the DR request unit price) for the customer's system 16 on the basis of the received advance notice and saves the created DR request information in the customer management table 71.

Incidentally, when the DR request is not made to the customer's system 16, for example, when there is no ancillary service request from the electric power supplier, the DR request type is "NONE." Incidentally, rules for the ancillary service are decided by the electric power supplier, so that various modes are possible.

For example, when the electric power supplier's system 14 does not issue the advance notice of the ancillary service, the agent server 12 may predict the ancillary service request. A possible prediction method is, for example, to: calculate a probability of issuance of the ancillary service request from the electric power supplier's system 14 based on the future weather forecast, etc. in consideration of the relationship between the past weather, temperatures, and so on and the number of times the ancillary service request was made; and determine that there is a high possibility of issuance of the ancillary service if the above-calculated probability is equal to or more than a specified value.

When the electric vehicle 9 is disconnected, the hybrid-power conditioning system 7 transmits the EV connection information (the facility code, the apparatus code, the connection status, the EV code, the residual charge capacity, and the charging rate) to the EV status management module 94 of the agent server 12 and the EV status management module 94 of the agent server 12 saves the received EV connection information in the EV connection information table 73 (SP3).

Next, the charge-discharge condition creation module 91 of the agent server 12 refers to the information of the customer management table 71 and the EV management table 72, creates the charge conditions of the electric vehicle 9 (the charge possibility, the charging rate upper limit value, and the charge unit price upper limit value) and the discharge conditions (the discharge possibility, the charging rate lower limit value, and the discharge unit price lower limit value) based on the prediction of the electric power demand and supply status within the customer's facility 3, and saves the created conditions in the EV management table 72 (SP4).

Figure 13:
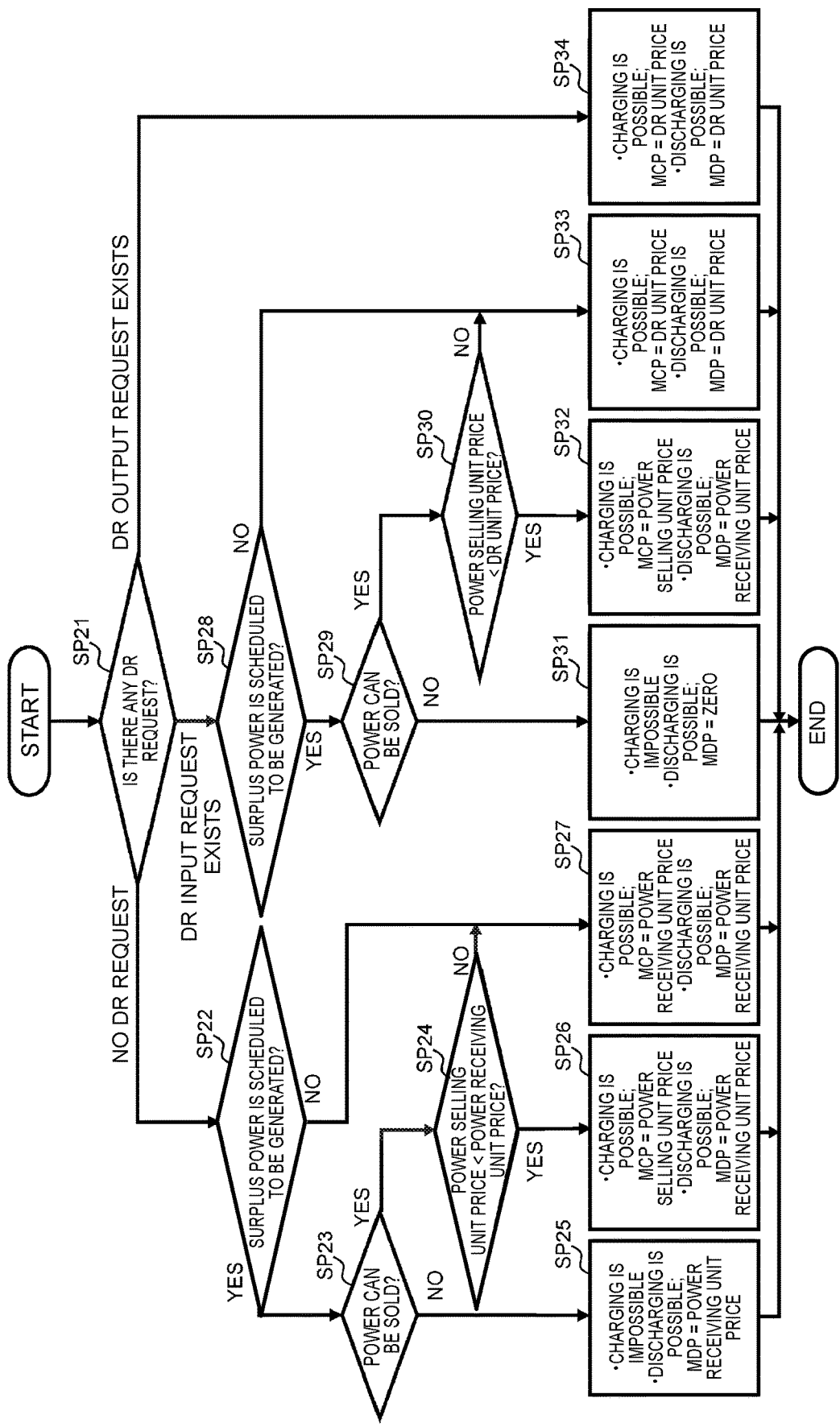
FIG. 13 is a flowchart illustrating a processing sequence for EV charge-discharge condition creation processing.

FIG. 13 illustrates a processing sequence for EV charge-discharge condition creation processing executed by the charge-discharge condition creation module 91. The charge-discharge condition creation module 91 creates the charge conditions and the discharge conditions according to this processing sequence.

Practically, the charge-discharge condition creation module 91 firstly judges whether there is any DR request or not, based on the DR request type in the customer management table 71 (SP21). If the charge-discharge condition creation module 91 obtains the result of this judgment that the DR request type is "NONE," it judges whether the electric power to be generated while staying at the customer's facility 3 as scheduled by the customer will exceed the power consumption and any surplus electric power will occur or not (SP22).

Specifically speaking, the charge-discharge condition creation module 91 acquires a value of the electric power scheduled to be consumed by referring to the power consumption while-staying-inside column of the customer management table 71. Moreover, the charge-discharge condition creation module 91 calculates a value of the electric power scheduled to be generated by the solar photovoltaic generating equipment 10 on the basis of the maximum output column, the installation direction column, the installation angle column, and the weather forecast column of the customer management table 71.

If the charge-discharge condition creation module 91 obtains an affirmative result in the judgment of step SP22, it judges whether the output (reverse power flow) from the customer's facility 3 to the system is permitted and the electric power can be sold or not, by checking whether the power selling possibility column of the customer management table 71 is "POSSIBLE" or "IMPOSSIBLE" (SP23). If the charge-discharge condition creation module 91 obtains a negative result in this judgment, it stores "IMPOSSIBLE" in the charge possibility column of the EV management table 72, "POSSIBLE" in the discharge possibility column, and the same value as that of the grid-connected power receiving unit price column of the customer management table 71 in the discharge unit price lower limit value (MDP: Minimum Discharge Price) column (SP25), and terminates this EV charge-discharge condition creation processing.

On the other hand, if the charge-discharge condition creation module 91 obtains an affirmative result in the judgment of step SP23, it judges whether the power receiving unit price exceeds the power selling unit price and the customer can earn income from, for example, the electric power supplier or not, by checking if the value of the grid-connected power receiving unit price column of the customer management table 71 is higher than the value of the grid-connected power selling unit price column or not (SP24). If the charge-discharge condition creation module 91 obtains an affirmative result in this judgment, it stores "POSSIBLE" in the charge possibility column of the EV management table 72, "POSSIBLE" in the discharge possibility column, the same value as that of the grid-connected power selling unit price column of the customer management table 71 in the power receiving unit price upper limit value (MCP: Minimum Charge Price) column, and the same value as that of the grid-connected power selling unit price column of the customer management table 71 in the discharge unit price lower limit value (MDP: Minimum Discharge Price) column (SP26), and terminates this EV charge-discharge condition creation processing.

On the other hand, if the charge-discharge condition creation module 91 obtains a negative result in the judgment of step SP22 or obtains a negative result in the judgment of step SP24, the charge-discharge condition creation module 91 stores "POSSIBLE" in the charge possibility column of the EV management table 72, "POSSIBLE" in the discharge possibility column, the same value as that of the grid-connected power receiving unit price column of the customer management table 71 in the power receiving unit price upper limit value (MCP: Minimum Charge Price) column, and the same value as that of the grid-connected power receiving unit price column of the customer management table 71 in the discharge unit price lower limit value (MDP: Minimum Discharge Price) column (SP27), and terminates this EV charge-discharge condition creation processing.

On the other hand, if the charge-discharge condition creation module 91 obtains the result in the judgment of step SP21 that the DR request type is "INPUT," it judges whether the electric power to be generated while staying at the customer's facility 3 as scheduled by the customer will exceed the power consumption and any surplus electric power will occur or not (SP28).

Specifically speaking, the charge-discharge condition creation module 91 acquires a value of the electric power scheduled to be consumed by referring to the power consumption while-staying-inside column of the customer management table 71. Moreover, the charge-discharge condition creation module 91 calculates a value of the electric power scheduled to be generated by the solar photovoltaic generating equipment 10 on the basis of the maximum output column, the installation direction column, the installation angle column, and the weather forecast column of the customer management table 71.

If the charge-discharge condition creation module 91 obtains an affirmative result in the judgment of step SP28, it judges whether the output (reverse power flow) from the customer's facility 3 to the system is permitted and the electric power can be sold or not, by checking whether the power selling possibility column of the customer management table 71 is "POSSIBLE" or "IMPOSSIBLE" (SP29). If the charge-discharge condition creation module 91 obtains a negative result in this judgment, it stores "IMPOSSIBLE" in the charge possibility column of the EV management table 72, "POSSIBLE" in the discharge possibility column, and 0 in the discharge unit price lower limit value (MDP:

Minimum Discharge Price) column (SP31), and terminates this EV charge-discharge condition creation processing.

On the other hand, if the charge-discharge condition creation module 91 obtains an affirmative result in the judgment of step SP29, it judges whether the DR request unit price exceeds the power selling unit price and the customer can earn income from, for example, the electric power supplier or not, by checking if the value of the DR request unit price column of the customer management table 71 is higher than the value of the grid-connected power selling unit price column or not (SP30). If the charge-discharge condition creation module 91 obtains an affirmative result in this judgment, it stores "POSSIBLE" in the charge possibility column of the EV management table 72, "POSSIBLE" in the discharge possibility column, the same value as that of the grid-connected power selling unit price column of the customer management table 71 in the power receiving unit price upper limit value (MCP: Minimum Charge Price) column, and the same value as that of the grid-connected power selling unit price column of the customer management table 71 in the discharge unit price lower limit value (MDP: Minimum Discharge Price) column (SP32), and terminates this EV charge-discharge condition creation processing.

On the other hand, if the charge-discharge condition creation module 91 obtains a negative result in the judgment of step SP28 or obtains a negative result in the judgment of step SP30, the charge-discharge condition creation module 91 stores "POSSIBLE" in the charge possibility column of the EV management table 72, "POSSIBLE" in the discharge possibility column, the same value as that of the DR request unit price column of the customer management table 71 in the power receiving unit price upper limit value (MCP: Minimum Charge Price) column, and the same value as that of the DR request unit price column of the customer management table 71 in the discharge unit price lower limit value (MDP: Minimum Discharge Price) column (SP33), and terminates this EV charge-discharge condition creation processing.

On the other hand, if the charge-discharge condition creation module 91 obtains the result in the judgment of step SP21 that the DR request type is "OUTPUT," it stores "POSSIBLE" in the charge possibility column of the EV management table 72, "POSSIBLE" in the discharge possibility column, the same value as that of the DR request unit price column of the customer management table 71 in the power receiving unit price upper limit value (MCP: Minimum Charge Price) column, and the same value as that of the DR request unit price column of the customer management table 71 in the discharge unit price lower limit value (MDP: Minimum Discharge Price) column (SP34), and terminates this EV charge-discharge condition creation processing.

Incidentally, the charge conditions and the discharge conditions are used to decide whether or not to execute charging or discharging when the customer goes out by riding the electric vehicle 9 and connects the electric vehicle 9 to the charge-discharge control apparatus 50 of the charge-discharge facility 40 such as a shop or a boost charge station.

The facility communication terminal 51 transmits the charge solicitation information (whether charging is solicitated or not, the charge unit price, and the charge amount per unit time) and the discharge solicitation information (whether discharging is solicitated or not, the discharge unit price, and the discharge amount per unit time), which have been input by the charge-discharge facility administrator, to the charge-discharge recommendation information creation module 92 of the agent server 12 and the charge-discharge recommendation information creation module 92 of the agent server 12 saves the received charge-discharge solicitation information in the charge-discharge facility management table 74 (SP5).

The charge-discharge recommendation information creation module 92 of the agent server 12 creates the charge-discharge recommendation information for the electric vehicle 9 from the charge solicitation information and the discharge solicitation information, which have been collected from the facility communication terminal 51, and transmits the created information to the customer's communication terminal 30 (SP6).

The charge-discharge recommendation information is a charge solicitation(s) whose charge unit price is less than the charge unit price upper limit value, and a discharge solicitation(s) whose discharge unit price is more than the discharge unit price lower limit value, which are extracted from the charge solicitation information and the discharge solicitation information that are saved in the charge-discharge facility management table 74. Incidentally, geographical positional information such as the latitude and the longitude may be further collected from the customer's communication terminal 30 and only the charge-discharge control apparatus 50 which is located at a geographically close position may be set as a target.

The customer's communication terminal 30 displays the charge-discharge recommendation screen (FIG. 4), as information about charge-discharge facilities 40 where it is desirable to perform charging and/or discharging of the electric vehicle 9, on the basis of the charge-discharge recommendation information transmitted from the charge-discharge recommendation information creation module 92 of the agent server 12 (SP7).

When the electric vehicle 9 is connected, the charge-discharge control apparatus 50 transmits the EV connection information (the apparatus code, the connection status, the EV code, the residual charge capacity, and the charging rate) to the charge-discharge execution judgment module 93 of the agent server 12; and the charge-discharge execution judgment module 93 of the agent server 12 saves the received EV connection information in the EV connection information table 73 (SP8).

After receiving the EV connection information, the charge-discharge execution judgment module 93 of the agent server 12 judges whether charging or discharging should be executed at the charge-discharge control apparatus 50 of the charge-discharge facility 40 or not (SP9).

Figure 14:
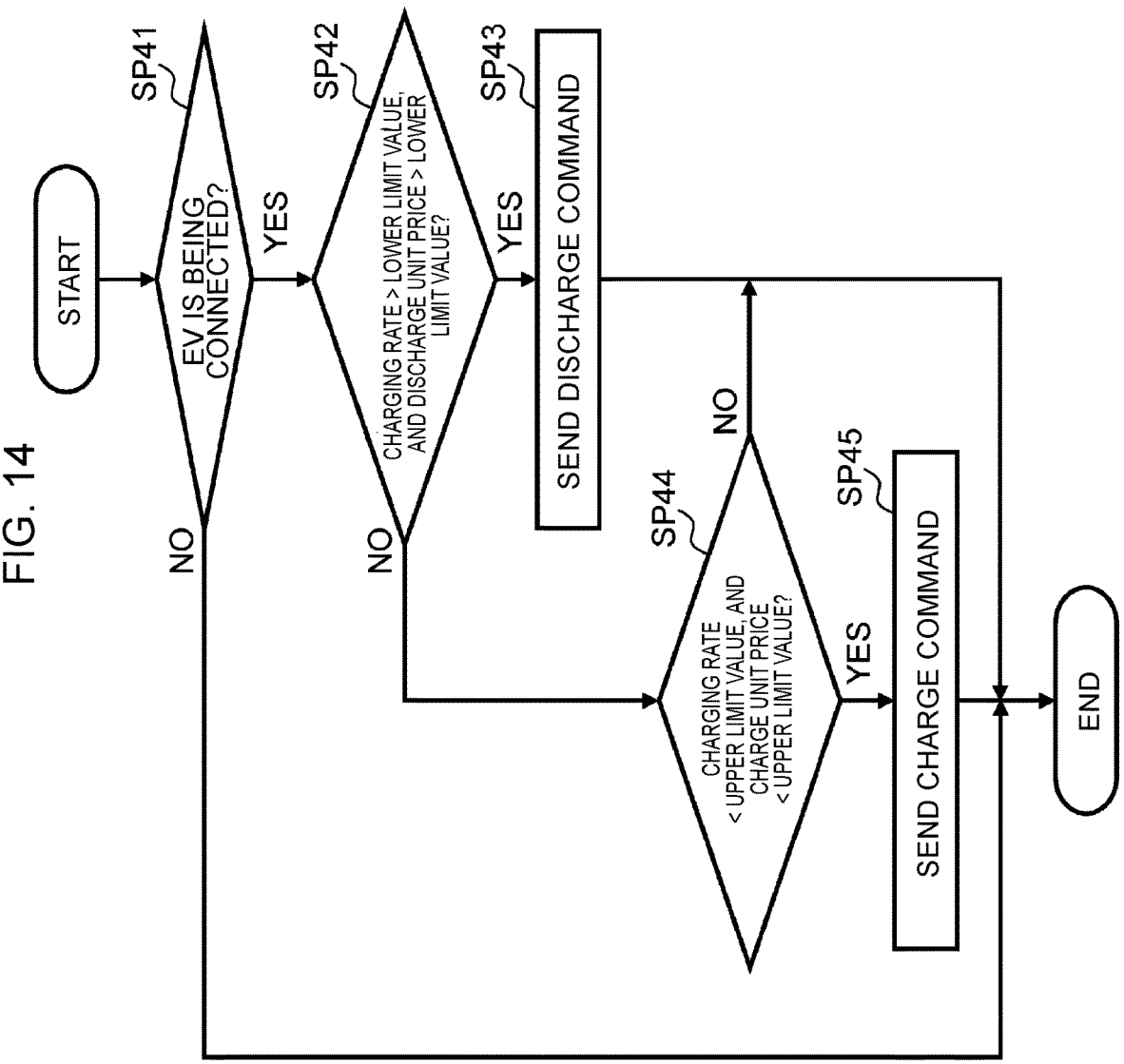
FIG. 14 is a flowchart illustrating a processing sequence for EV charge-discharge execution judgment processing.

FIG. 14 illustrates a processing sequence for EV charge-discharge execution judgment processing executed by the charge-discharge execution judgment module 93. The charge-discharge execution judgment module 93 judges whether to charge the electric vehicle 9 or discharge the electric vehicle 9 according to this processing sequence.

Specifically speaking, the charge-discharge execution judgment module 93 judges whether the electric vehicle 9 is connected to the hybrid-power conditioning system 7 or the charge-discharge control apparatus 50 or not, by checking if the connection status column of the EV connection information table 73 is "CONNECTED" or "UNCONNECTED" (SP41). If the charge-discharge execution judgment module 93 obtains a negative result in this judgment, it terminates this EV charge-discharge execution judgment processing.

On the other hand, if the charge-discharge execution judgment module 93 obtains an affirmative result in the judgment of step SP41, it judges whether or not the value of the charging rate column of the EV connection information table 73 is larger than the value of the charging rate lower limit value column of the EV management table 72 and the value of the discharge unit price column of the charge-discharge facility management table 74 is larger than the value of the discharge unit price lower limit value column of the EV management table 72 (SP42). If the charge-discharge execution judgment module 93 obtains an affirmative result in this judgment, it sends a discharge command to the charge-discharge control apparatus 50 of the charge-discharge facility 40 to indicate that the electric power may be discharged to reach the value of the charging rate lower limit value column of the EV management table 72 (SP43), and it terminates this EV charge-discharge execution judgment processing.

On the other hand, if the charge-discharge execution judgment module 93 obtains a negative result in the judgment of step SP42, it judges whether or not the value of the charging rate column of the EV connection information table 73 is smaller than the value of the charging rate upper limit value column of the EV management table 72 and the value of the charge unit price column of the charge-discharge facility management table 74 is smaller than the value of the charge unit price upper limit value column of the EV management table 72 (SP44). If the charge-discharge execution judgment module 93 obtains a negative result in this judgment, it terminates this EV charge-discharge execution judgment processing.

On the other hand, if the charge-discharge execution judgment module 93 obtains an affirmative result in the judgment of step SP44, it sends a charge command to the charge-discharge control apparatus 50 of the charge-discharge facility 40 to indicate that the electric power may be charged to reach the value of the charging rate upper limit value column of the EV management table 72 (SP45); and it terminates this EV charge-discharge execution judgment processing.

When the charge-discharge execution judgment module 93 of the agent server 12 performs charging-discharging based on the judgment of the EV charge-discharge execution judgment processing, it sends a charge-discharge command to the charge-discharge control apparatus 50 (SP10). The charge-discharge control apparatus 50 executes charging-discharging of the connected electric vehicle 9 according to the charge-discharge command received from the charge-discharge execution judgment module 93 of the agent server 12 (SP11).

When the charge-discharge execution judgment module 93 sends the charge-discharge command to the charge-discharge control apparatus 50, the EV status management module 94 of the agent server 12 transmits the EV status to the customer's communication terminal 30 (SP12). The customer's communication terminal 30 displays the EV status, which has been transmitted from the EV status management module 94 of the agent server 12, on the screen or the like (SP13).

When the electric vehicle 9 is disconnected, the charge-discharge control apparatus 50 transmits the EV connection information (the apparatus code, the connection status, the EV code, the residual charge capacity, and the charging rate) to the EV status management module 94 of the agent server 12 and the EV status management module 94 of the agent server 12 saves the received EV connection information in the EV connection information table 73 (SP14).

When the electric vehicle 9 is connected, the hybrid-power conditioning system 7 transmits the EV connection information (the apparatus code, the connection status, the EV code, the residual charge capacity, and the charging rate) to the EV status management module 94 of the agent server 12 and the EV status management module 94 of the agent server 12 saves the received EV connection information in the EV connection information table 73 (SP15).

The electric power supplier's server 15 sends an official request for the ancillary service to the agent server 12 (SP16). The DR request management module 95 of the agent server 12 transmits the DR request information to the hybrid-power conditioning system 7 in response to the ancillary service request received from the electric power supplier's server 15 (SP17).

The hybrid-power conditioning system 7 controls charging-discharging of the electric vehicle 9 connected to the hybrid-power conditioning system 7 according to the DR request information received from the DR request management module 95 of the agent server 12 (SP18). Incidentally, when the DR request information from the DR request management module 95 of the agent server 12 is not received, the hybrid-power conditioning system 7 controls charging-discharging of the electric vehicle 9 according to, for example, the surplus state of the electric power within the customer's facility 3.

(4) Advantageous Effects of This Embodiment

With the agent system 1 according to this embodiment as described above, charging-discharging of the electric vehicle 9 is performed at the charge-discharge facility 40 on the basis of the prediction of the electric energy generated and consumed by the customer.

Therefore, this agent system 1 makes it possible to expand the electric energy which can be adjusted by the customer by charging-discharging of the EV, and to expand the electric energy which can be captively consumed by the customer within the customer's facility.

Furthermore, with this agent system 1, the guidance of the EV to a facility is promoted for the purpose of, for example, attracting customers to a shop or the like and emergently supplying the electric power in disasters and the customer can charge and/or discharge the EV under advantageous conditions. Therefore, even under the current circumstances where the advantages of introducing the renewable energy have been decreasing, the customer can maintain the advantages of introducing the renewable energy.

(5) Other Embodiments

Incidentally, the aforementioned embodiment has described the case where the agent server 12 creates the charge-discharge conditions and judges whether to execute charging-discharging; however, the present invention is not limited to this example and for example, the hybrid-power conditioning system 7 may create the charge-discharge conditions and judge whether to execute charging-discharging, and a specific configuration is not limited and can be changed on a timely basis within the scope without departing from the gist of the present invention.

Furthermore, the aforementioned embodiment has described the case where the aggregator makes the DR request in response to the ancillary service request from the electric power supplier; however, the present invention is not limited to this example and the aggregator may make the DR request according to, for example, the price of the electric power exchange market.

Specifically speaking, when the price transmitted from the electric power exchange market's server 19 is equal to or more than a specified value, the agent server 12 transmits the DR request information to the customer's system 16 to curtail the input (the received power amount) from the system 2 or promote the output (the reverse power flow) to the system 2.

Contrarily, when the price transmitted from the electric power exchange market's server 19 is less than the specified value, the agent server 12 transmits the DR request information to the customer's system 16 to promote the input (the received power amount) from the system 2. The agent server 12 also decides the DR request information (the DR request type, the DR request target time slot, and the DR request unit price) based on the price predicted by the electric power exchange market's system 18 and saves the decided DR request information in the customer management table 71.

Furthermore, the aforementioned embodiment has described the case where the DR request information is transmitted from the agent server 12 to the hybrid-power conditioning system 7; however, the present invention is not limited to this example and the DR request information may be transmitted, for example, from the agent server 12 to the customer's communication terminal 30.

As a result, by displaying the received DR request information on the screen, the customer's communication terminal 30 can make the customer recognize that the DR request has been made, and can urge the customer to take the action to connect the EV to the hybrid-power conditioning system 7 in order to respond to the DR request.

Furthermore, the aforementioned embodiment has described the case where the EV list screen is displayed on the facility communication terminal 51; however, the present invention is not limited to this example and, for example, the EV list screen may be displayed on a monitor or the like connected to the agent server 12 and the aggregator may refer to the EV list screen in order to check the status of the electric vehicle 9 when making the DR request.

REFERENCE SIGNS LIST

1: agent system
2: system
3: customer's facility
4: AC meter
5: distribution board
6: load
7: hybrid-power conditioning system (H-PCS)
9: electric vehicle (EV)
10: solar photovoltaic generating equipment (PV)
11: aggregator system
12: agent server
14: electric power supplier's system
15: electric power supplier's server
16: customer's system
17: charge-discharge facility administrator's system
18: electric power exchange market's system
19: electric power exchange market's server
30: customer's communication terminal
40: charge-discharge facility
50: charge-discharge control apparatus
51: facility communication terminal
71: customer management table
72: EV management table
73: EV connection information table
74: charge-discharge facility management table

The invention claimed is:

1. An aggregation control system for adjusting electric power between a plurality of facilities via a mobile storage battery apparatus, comprising:

a computer included in each of the plurality of facilities that controls charging and discharging of the mobile storage battery apparatus; and a server apparatus coupled to each computer of the facilities, wherein the server apparatus is programmed to:

create a charge and/or discharge condition for the mobile storage battery apparatus on the basis of management information for electric power demand and supply at a specified facility among the plurality of facilities, compare a charge and/or discharge request to a control apparatus of the specified facility with the charge and/or discharge condition, and issue a command to the control apparatus to charge or discharge the mobile storage battery apparatus according to a result of the comparison, wherein the specified facility and the mobile storage battery apparatus are possessed by a customer, wherein the server apparatus creates the charge and/or discharge condition based on a prediction of a demand response request to be made to the customer, wherein a prediction of demand processing is further made by extracting use dates and times and use distances which match the relevant month and the relevant day(s) of the week from the past EV connection information of the electric vehicle and calculating an average use date and time and an average use distance, and adopting a high-frequency-use date and time and a high-frequency-use distance, and wherein the server apparatus creates the charge and/or discharge condition based on scheduled use of the mobile storage battery apparatus by the customer.

2. The aggregation control system according to claim 1, wherein the server apparatus:

acquires charge and/or discharge solicitation information including a place where electric power is required and miscellaneous conditions from the control apparatus;

creates charge and/or discharge recommendation information including conditions to recommend charge and/or discharge from the charge and/or discharge condition and the charge and/or discharge solicitation information; and transmits the charge and/or discharge recommendation information to a communication terminal possessed by the customer; and wherein the communication terminal displays the charge and/or discharge recommendation information.

3. An aggregation control method for adjusting electric power between a plurality of facilities via a mobile storage battery apparatus, each of the plurality of facilities including a computer that controls charging and discharging of the mobile storage battery apparatus, and a server apparatus coupled to each computer, the server apparatus executing steps comprising:

creating a charge and/or discharge condition for the mobile storage battery apparatus on the basis of management information for electric power demand and supply at a specified facility among the plurality of facilities;

comparing a charge and/or discharge request to a control apparatus of the specified facility with the charge and/or discharge conditions; and issuing a command to the control apparatus to charge or discharge the mobile storage battery apparatus according to a result of the comparison, wherein the server apparatus creates the charge and/or discharge condition based on a prediction of a demand response request to be made to the customer, wherein a prediction of demand processing is further made by extracting use dates and times and use distances which match the relevant month and the relevant day(s) of the week from the past EV connection information of the electric vehicle and calculating an average use date and time and an average use distance, and adopting a high-frequency-use date and time and a high-frequency-use distance, and wherein the server apparatus creates the charge and/or discharge condition based on scheduled use of the mobile storage battery apparatus by the customer.

* * * * *